United States Patent
Kiley et al.

(10) Patent No.: US 7,873,710 B2
(45) Date of Patent: Jan. 18, 2011

(54) CONTEXTUAL DATA COMMUNICATION PLATFORM

(75) Inventors: Kevin J. Kiley, Bigelow, AR (US); Peter J. Cranstone, Littleton, CO (US); Elizabeth A. Coker, Boulder, CO (US)

(73) Assignee: 5o9, Inc., Boulder, CO (US)

( * ) Notice: Subject to any disclaimer, the term of this patent is extended or adjusted under 35 U.S.C. 154(b) by 220 days.

(21) Appl. No.: 12/016,996

(22) Filed: Jan. 19, 2008

(65) Prior Publication Data
US 2008/0189360 A1 Aug. 7, 2008

Related U.S. Application Data

(60) Provisional application No. 60/888,318, filed on Feb. 6, 2007.

(51) Int. Cl.
G06F 15/173 (2006.01)
(52) U.S. Cl. .................. 709/220; 709/206; 709/228; 455/310
(58) Field of Classification Search .......... 709/220, 709/224, 228, 203, 227, 206; 455/556.1, 455/557
See application file for complete search history.

(56) References Cited

U.S. PATENT DOCUMENTS

| | | | |
|---|---|---|---|
| 5,930,474 A | 7/1999 | Dunworth et al. | |
| 5,961,593 A | 10/1999 | Gabber et al. | |
| 6,728,628 B2 | 4/2004 | Peterson | |
| 7,069,143 B2 | 6/2006 | Peterson | |
| 7,096,200 B2 * | 8/2006 | Wang et al. | 705/50 |
| 7,231,205 B2 * | 6/2007 | Guyot et al. | 455/414.1 |
| 7,433,710 B2 * | 10/2008 | Bodnar et al. | 455/556.1 |
| 7,640,215 B2 * | 12/2009 | Wang et al. | 705/50 |
| 2003/0050964 A1 | 3/2003 | Debaty et al. | |
| 2003/0095681 A1 * | 5/2003 | Burg et al. | 382/100 |
| 2003/0174683 A1 | 9/2003 | Vegge | |
| 2003/0229900 A1 * | 12/2003 | Reisman | 725/87 |

(Continued)

FOREIGN PATENT DOCUMENTS

WO 2005091568 9/2005

OTHER PUBLICATIONS

International Search Report and Written Opinion for PCT Application PCT/US08/53220, mailed Jul. 21, 2008.

(Continued)

*Primary Examiner*—Khanh Q Dinh
(74) *Attorney, Agent, or Firm*—Hamilton, DeSanctis & Cha LLP

(57) ABSTRACT

Systems and methods for a contextual data platform are provided. According to one embodiment, a request is received from a client at a server. Responsive to the request, the client is caused to display a customized menu structure by transmitting to the client contextual menu information based in part on a resource associated with the request. According to another embodiment, an augmented HyperText Transport Protocol (HTTP) request is received from a client application. The augmented HTTP request identifies a resource and indicates a desired action to be performed on the resource. Personalization information is identified and extracted from HTTP header fields associated with the request. The personalization information includes one or more of personal and preference information, device information and location information. Then, the content associated with the resource and/or a format in which the content is delivered to the client application is customized based on the personalization information.

18 Claims, 14 Drawing Sheets

U.S. PATENT DOCUMENTS

| | | |
|---|---|---|
| 2004/0193676 A1* | 9/2004 | Marks .................... 709/203 |
| 2005/0039141 A1 | 2/2005 | Burke et al. |
| 2005/0228860 A1 | 10/2005 | Hamynen et al. |
| 2006/0074980 A1* | 4/2006 | Sarkar .................... 707/104.1 |
| 2007/0022442 A1 | 1/2007 | Gil et al. |
| 2007/0038516 A1* | 2/2007 | Apple et al. ................ 705/14 |
| 2007/0060099 A1 | 3/2007 | Ramer et al. |
| 2007/0060109 A1 | 3/2007 | Ramer et al. |
| 2007/0060114 A1 | 3/2007 | Ramer et al. |
| 2007/0060129 A1 | 3/2007 | Ramer et al. |
| 2007/0060136 A1 | 3/2007 | Ramer et al. |
| 2007/0060173 A1 | 3/2007 | Ramer et al. |
| 2007/0061197 A1 | 3/2007 | Ramer et al. |
| 2007/0061198 A1 | 3/2007 | Ramer et al. |
| 2007/0061211 A1 | 3/2007 | Ramer et al. |
| 2007/0061229 A1 | 3/2007 | Ramer et al. |
| 2007/0061242 A1 | 3/2007 | Ramer et al. |
| 2007/0061243 A1 | 3/2007 | Ramer et al. |
| 2007/0061244 A1 | 3/2007 | Ramer et al. |
| 2007/0061245 A1 | 3/2007 | Ramer et al. |
| 2007/0061246 A1 | 3/2007 | Ramer et al. |
| 2007/0061247 A1 | 3/2007 | Ramer et al. |
| 2007/0061300 A1 | 3/2007 | Ramer et al. |
| 2007/0061301 A1 | 3/2007 | Ramer et al. |
| 2007/0061302 A1 | 3/2007 | Ramer et al. |
| 2007/0061303 A1 | 3/2007 | Ramer et al. |
| 2007/0061317 A1 | 3/2007 | Ramer et al. |
| 2007/0061328 A1 | 3/2007 | Ramer et al. |
| 2007/0061331 A1 | 3/2007 | Ramer et al. |
| 2007/0061332 A1 | 3/2007 | Ramer et al. |
| 2007/0061333 A1 | 3/2007 | Ramer et al. |
| 2007/0061334 A1 | 3/2007 | Ramer et al. |
| 2007/0061335 A1 | 3/2007 | Ramer et al. |
| 2007/0061336 A1 | 3/2007 | Ramer et al. |
| 2007/0061363 A1 | 3/2007 | Ramer et al. |
| 2007/0066364 A1 | 3/2007 | Gil et al. |
| 2007/0118520 A1 | 5/2007 | Bliss et al. |
| 2007/0156522 A1 | 7/2007 | Carpenter et al. |
| 2007/0157227 A1 | 7/2007 | Carpenter et al. |
| 2007/0159522 A1 | 7/2007 | Neven |
| 2007/0184855 A1 | 8/2007 | Klassen |
| 2007/0291710 A1 | 12/2007 | Fadell |
| 2008/0005668 A1 | 1/2008 | Mavinkurve et al. |

OTHER PUBLICATIONS

R. Fielding et al., "Hypertext Transfer Protocol—HTTP/1.1" Network Working Group. 114 pages, Jun. 1999.

\* cited by examiner

810

[...]
HTTP_5O9_AOD="(Accept=All;)"
HTTP_ACCEPT="*/*"
HTTP_ACCEPT_ENCODING="gzip, deflate, bz2"
HTTP_ACCEPT_LANGUAGE="en-us"
HTTP_CONNECTION="Keep-Alive"
HTTP_MTHL="(Yes;v1.0;)"
HTTP_HTTPM="(Yes;v1.0;)"
HTTP_USER_AGENT="5o9-MobileMe-PIE-1.02;)"
815 {
HTTP_E5O9D001="9B7436ADDBE58CD5ECC60011136A2D7F84F3"
HTTP_E5O9D002="9B7436ADD4E58CAABE83493D5258287C93AA713E2998FE3FDD323C73"
HTTP_E5O9D003="9B7436ADC1E58CAFBC80584C0011762BD2BD"
HTTP_E5O9D004="9B7436ADD0E58CEAE6DB0013565804728EE617323386"
HTTP_E5O9D005="9B7436ADCFE58CA9BB805849"
HTTP_E5O9D006="9B7436A1D99EF8AFB390594601112733DD5BC0A6570BC"
HTTP_E5O9D007="9B7436A1D990E2AFB3905A4B06176A24D3B20A7D12"
}
[...]

[...]
HTTP_5O9_AOD="(Accept=All;)"
HTTP_ACCEPT="*/*"
HTTP_ACCEPT_ENCODING="gzip, deflate, bz2"
HTTP_ACCEPT_LANGUAGE="en-us"
HTTP_CONNECTION="Keep-Alive"
HTTP_MTHL="(Yes;v1.0;)"
HTTP_HTTPM="(Yes;v1.0;)"
HTTP_USER_AGENT="5o9-MobileMe-PIE-1.02;)"
825 {
HTTP_5O9CALT1="232.0"
HTTP_5O9CLAT1="08375.4634,W"
HTTP_5O9CLON1="3456.7283,N"
HTTP_5O9OA="1234 Ulster St."
HTTP_5O9OE="jdoe@aol.com"
HTTP_5O9ON="John Doe"
HTTP_5O9OT="12345678901"
}
[...]

```
ME_API int Me_AddRequestHeaders( ADDREQUESTHEADERS_INPUT_PARAMETERS *p )
{
 // Called just before a browser navigation takes place.
 // The module may add custom outbound request headers at this time.

return ME_OK;

}// End of Me_AddRequestHeaders()
```

FIG. 8C

```
typedef struct ADDREQUESTHEADERS_INPUT_PARAMETERS
{
 // Version information
 long size_of_structure;   // The size of the structure long version_major;       // Version MAJOR number
 long version_minor;       // Version MINOR number
 long version_subminor;    // Version SUB-MINOR number
 long version_build;       // Version BUILD number // Input/Output parameters
 long   actioncode; // The action code for this call
 long   call_count; // The sequence number for this call TCHAR *uri;        // The fully-qualified URI for the current request TCHAR *header_name_buffer;       // Buffer that accepts the header NAME
 long   header_name_buffer_maxlen; // Maximum length of the buffer TCHAR *header_value_buffer;      // Buffer that accept the header VALUE
 long   header_value_buffer_maxlen; // Maximum length of the buffer long   encryption_action;        // Can be set to one of the
                                  // following...
                                  // HEADER_CAN_BE_ENCRYPTED ( Default )
                                  // HEADER_MUST_BE_ENCRYPTED
                                  // HEADER_MUST_NOT_BE_ENCRYPTED

}ADDREQUESTHEADERS_INPUT_PARAMETERS;
```

FIG. 8D

```
ME_API int Me_AddRequestHeaders( ADDREQUESTHEADERS_INPUT_PARAMETERS *p )
{
 // Called just before a browser navigation takes place.
 // The module may add custom outbound request headers at this time.

// Check the 'p->actioncode' parameter in the inbound structure.
 // If the 'actioncode' is ZERO then this means it is OK to go
 // ahead and add our own custom request header.

if ( p->actioncode == 0 )
   :
   // Add custom request header "HeaderName1: HeaderValue1"...

wsprintf( p->header_name_buffer,  _T("HeaderName1:") );
   wsprintf( p->header_value_buffer, _T("HeaderValue1") );
   :

return ME_OK;

}// End of Me_AddRequestHeaders()
```

FIG. 8E

```
ME_API int Me_AddRequestHeaders( ADDREQUESTHEADERS_INPUT_PARAMETERS *p )
{
 // Called just before a browser navigation takes place.
 // The module may add custom outbound request headers at this time.

// Check the 'p->actioncode' parameter in the inbound structure.
 // If the 'actioncode' is ZERO then this means it is OK to go
 // ahead and add our own custom request header...

if ( p->actioncode == 0 )
   {
   // Add custom request header "HeaderName1: HeaderValue1"...

wsprintf( p->header_name_buffer,  _T("HeaderName1:") );
   wsprintf( p->header_value_buffer, _T("HeaderValue1") );

// Choose a header encryption option...
   //
   // The 'p->encryption_action' flag of the parameter structure
   // can be used to choose an encryption option for the custom
   // request header being added.
   //
   // Possible values for the 'p->encryption_action' flag are...
   //
   // HEADER_CAN_BE_ENCRYPTED
   // This is the default if no other encryption action is
   // specified. If encryption is turned 'on' and other
   // headers are being encrypted automatically then any
   // headers added in this function will also be encrypted.
   // If the automatic encryption option is OFF then any
   // headers added from this function will NOT be encrypted.
   //
   // HEADER_MUST_BE_ENCRYPTED
   // If this value is specified for the encryption action then
   // any headers added from this function WILL be encrypted
   // regardless of the default client settings for encryption.
   //
   // HEADER_MUST_NOT_BE_ENCRYPTED
   // If this value is specified for the encryption action then
   // any headers added from this function will NOT be encrypted
   // regardless of the default client settings for encryption.

p->encryption_action = HEADER_CAN_BE_ENCRYPTED;
   } return ME_OK;

}// End of Me_AddRequestHeaders()
```

FIG. 8F

```
ME_API int Me_AddRequestHeaders( ADDREQUESTHEADERS_INPUT_PARAMETERS *p )
{
 // Called just before a browser navigation takes place.
 // The module may add custom outbound request headers at this time.

// HOW TO CHECK FOR NAVIGATIONS TO CERTAIN DOMAINS OR URIs...
 //
 // Just check the inbound 'p->uri' parameter.
 //
 // This parameter is always the fully-qualified URI
 // of the page being navigated to and it includes the
 // DOMAIN NAME as well as the specific page request.
 //
 // NOTE: The 'p->uri' parameter is a TCHAR (WIDE) string so
 // use POSIX standard _wcnsicmp() function for a case-insensitive
 // string comparison...

if ( _wcsnicmp( p->uri, _T("http://www.ourdomain.com"), 24 ) == 0 )
   {
     // The current NAVIGATION is to 'our domain' so go ahead
     // and add our own custom request header...

if ( p->actioncode == 0 )
       {
         // Add custom request header "HeaderName1: HeaderValue1"...

wsprintf( p->header_name_buffer,  _T("HeaderName1:") );
         wsprintf( p->header_value_buffer, _T("HeaderValue1") );
       }

}// End domain name check return ME_OK;

}// End of Me_AddRequestHeaders()
```

FIG. 8G

```
ME_API int Me_AddRequestHeaders( ADDREQUESTHEADERS_INPUT_PARAMETERS *p )
{
 // Called just before a browser navigation takes place.
 // The module may add custom outbound request headers at this time.

// HOW TO ADD AN ENCRYPTED HEADER FOR A CERTAIN DOMAIN
 //
 // Just check the inbound 'p->uri' parameter.
 //
 // This parameter is always the fully-qualified URI
 // of the page being navigated to and it includes the
 // DOMAIN NAME as well as the specific page request.
 //
 // NOTE: The 'p->uri' parameter is a TCHAR (WIDE) string so
 // use POSIX standard _wcsicmp() function for a case-insensitive
 // string comparison...

if ( _wcsnicmp( p->uri, _T("http://www.ourdomain.com"), 24 ) == 0 )
   {
     // The current NAVIGATION is to 'our domain' so go ahead
     // and add our own custom ENCRYPTED request header...

if ( p->actioncode == 0 )
       {
         // Add custom request header "HeaderName1: HeaderValue1"...

wsprintf( p->header_name_buffer,  _T("HeaderName1:") );
         wsprintf( p->header_value_buffer, _T("HeaderValue1") );

// Make sure the header is sent using ENCRYPTION...

p->encryption_action = HEADER_MUST_BE_ENCRYPTED;
       }

}// End domain name check return ME_OK;

}// End of Me_AddRequestHeaders()
```

FIG. 8H

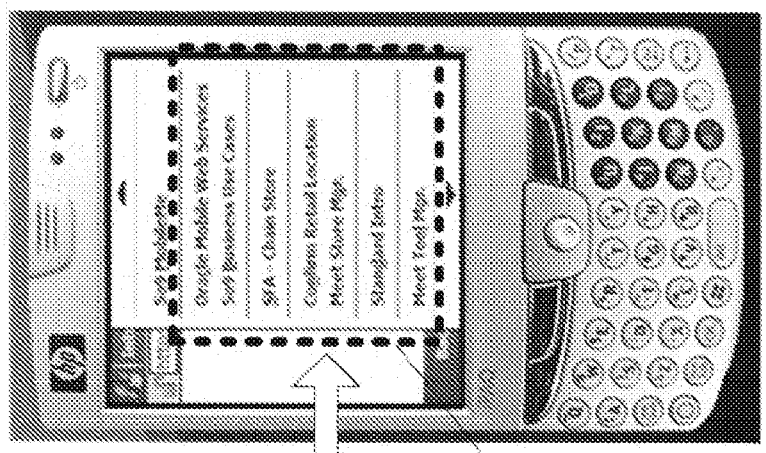

FIG. 9B

```
910
<!DOCTYPE html PUBLIC "-//W3C//DTD XHTML 1.0 Transitional//EN" "http://www.w3.org/TR/xhtml1/
DTD/xhtml1-transitional.dtd">
<html xmlns="http://www.w3.org/1999/xhtml">
<head>
<meta http-equiv="Content-Type" content="text/html; charset=iso-8859-1" />
<title>Oracle Mobile SFA</title>
<style type="text/css">611
<script>
<!--                                                        911          912
MENU START
separator
Oracle Mobile Web Services, http://www.5o9inc.com/usecases/oracle.html
separator
5o9 Business Use Cases, http://www.5o9inc.com/usecases/usecases.html
separator
SFA – Chain Store, http://www.5o9inc.com/usecases/o_sfa_c.html
separator
Confirm Retail Location, http://www.5o9inc.com/usecases/o_sfa_c.html
Meet Store Mgr., http://www.5o9inc.com/usecases/o_sfa_msm.html
Separator
Standard Intro, http://www.5o9inc.com/usecases/o_sfa_std_intro.html
separator
Meet Tool Mgr., http://www.5o9inc.com/usecases/o_sfa_mtm.html
separator
MENU END
-->
</script>

CONTEXTUAL DATA COMMUNICATION PLATFORM

CROSS-REFERENCE TO RELATED APPLICATIONS

This application claims the benefit of U.S. Provisional Application No. 60/888,318, filed on Feb. 6, 2007, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2006-2008 5o9, Inc.

BACKGROUND

1. Field

Embodiments of the present invention generally relate to Internet communications and mechanisms that enable contextual data to be exchanged between web clients and web servers. More specifically, embodiments of the present invention provide infrastructure and both client and server-side functionality to enable location data, device capabilities, operating system capabilities, user data and dynamic contextual menus to be securely, efficiently and cost-effectively delivered over any web connection between a web-enabled device and a web server and/or web services, thereby enabling various business usage models, such as local search, local advertising, location-based services, mobile asset management, mobile data policy management, mobile coupons, proximity marketing, personalized content, permission marketing and closed-loop virtual/physical marketing among others.

2. Description of the Related Art

Enterprise customers need a simple and cost-effective solution that enables their customers or employees to transmit real-time location, device and user data over the Internet to support personalized content and services. Users want a better experience and control over their privacy. Businesses need a cost-effective, efficient way of supporting mobile employees, delivering location-based services, and properly formatted, relevant content to their customers. They need to do all of this regardless of the device or network connection. Current solutions and services require high CAPEX/OPEX commitments and don't offer persistence across different networks.

On the other side of the value chain, consumers using mobile devices are subjected to a poor user experience in terms of data entry, latency and content formatting—creating unnecessary transactional friction. Additionally, the advent of mobile marketing exposes consumers to unwanted interruptions. They are demanding technologies that are convenient, yet still give them privacy and control over their privacy. The issues of convenience, privacy and control must be addressed before businesses and consumers can fully realize the economic and social benefits of the mobile Web.

SUMMARY

Systems and methods are described for a contextual data platform. According to one embodiment, various server-side processing associated with causing a client to display a site appropriate dynamic contextual menu includes a request being received from the client at an information server. Responsive to the request, the client is caused to display a customized menu structure by transmitting to the client contextual menu information based at least in part on a resource associated with the request.

In the aforementioned server-side processing embodiment in which a client is caused to display a customized menu structure, the request may be a HyperText Transport Protocol (HTTP) request.

In various instances of the aforementioned server-side processing embodiments in which a client is caused to display a customized menu structure, the request may be an augmented HTTP request.

In the context of various of the aforementioned server-side processing embodiments in which a client is caused to display a customized menu structure, the request may include contextual data indicative of one or more of (i) personal information regarding an end user of an Internet-enabled device upon which the client is running, (ii) device information regarding capabilities or characteristics of the Internet device and (iii) a geographical location of the Internet-enabled device. Furthermore, the contextual menu information may be influenced by the contextual data.

In the context of various of the aforementioned server-side processing embodiments in which a client is caused to display a customized menu structure, the Internet-enabled device may be a personal computer (PC), a laptop computer, an ultra mobile PC, a game console, a pocket personal computer or a mobile phone.

In various instances of the aforementioned server-side processing embodiments in which a client is caused to display a customized menu structure, the customized menu structure may be a browser menu and the contextual menu information may be intended at least in part to shift navigation away from a web page associated with the resource and into the browser menu.

In the context of various of the aforementioned server-side processing embodiments in which a client is caused to display a customized menu structure, transmitting the contextual menu information to the client involves transmitting to the client an augmented HyperText Markup Language (HTML) file within which the contextual menu information is embedded.

In the context of various of the aforementioned server-side processing embodiments in which a client is caused to display a customized menu structure, the client may be a browser and the server-side processing may further involve identifying and extracting contextual data from one or more HTTP header fields associated with the HTTP request and providing the browser the contextual menu information according to which the browser is to programmatically customize menus associated with the browser based on a web service identified by the HTTP request and at least a portion of the contextual data.

Other embodiments of the present invention provide, various client-side processing associated with displaying a site appropriate dynamic contextual menu. A request to an information server is generated by a client. A response is received to the request that has contextual menu information associated with it which is based at least in part on a resource identified by the request. Then, responsive to the contextual menu information, the client displays a customized menu structure to facilitate ongoing interaction with the resource.

In the aforementioned client-side processing embodiment in which a client displays a customized menu structure, the request may be a HyperText Transport Protocol (HTTP) request.

In various instances of the aforementioned client-side processing embodiments in which a client displays a customized menu structure, the request may be an augmented HTTP request.

In the context of various of the aforementioned client-side processing embodiments in which a client displays a customized menu structure, the request may include contextual data indicative of one or more of (i) personal information regarding an end user of an Internet-enabled device upon which the client is running, (ii) device information regarding capabilities or characteristics of the Internet device and (iii) a geographical location of the Internet-enabled device. Furthermore, the contextual menu information may be influenced by the contextual data.

In various instances of the aforementioned client-side processing embodiments in which a client displays a customized menu structure, the customized menu structure may be a browser menu and the contextual menu information may be intended at least in part to shift navigation away from a web page associated with the resource and into the browser menu.

In the context of various of the aforementioned client-side processing embodiments in which a client displays a customized menu structure, receiving the response involves receiving an augmented HyperText Markup Language (HTML) file within which the contextual menu information is embedded.

Other embodiments of the present invention provide, various server-side processing associated with customizing content and/or the format of content delivered to a client application. An augmented HyperText Transport Protocol (HTTP) request is received from a client application. The augmented HTTP request identifies a resource and indicates a desired action to be performed on the identified resource. Personalization information is identified and extracted from one or more HTTP header fields associated with the augmented HTTP request. The personalization information includes one or more of (i) personal and preference information regarding an end user of a client device running the client application, (ii) device information regarding capabilities or characteristics of the client device and (iii) location information indicative of a geographical location of the client device. Then, one or more of content associated with the identified resource and a format in which the content is delivered to the client application is customized based on the personalization information.

In the aforementioned server-side processing embodiment in which content and/or the format of content delivered to a client application is customized, the personal and preference information may include personal interest data and/or demographic data.

In various instances of the aforementioned server-side processing embodiments in which content and/or the format of content delivered to a client application is customized, the personal and preference information may include user or machine-entered demographic, psychographic, preference and personally identifying data.

In the context of various of the aforementioned server-side processing embodiments in which content and/or the format of content delivered to a client application is customized, the personally identifying data may include, but is not limited to, one or more of a name of the end user, an address of the end user, a phone number at which the end user can be contacted, an electronic mail (email) address at which the end user can be reached, a social security number of the end user, a national ID number of the end user, an employee number of the end user, credit card information of the end user and a language in which the end user would prefer information to be presented.

In the context of various of the aforementioned server-side processing embodiments in which content and/or the format of content delivered to a client application is customized, the device information may include, but is not limited to, one or more of characteristics, settings or parameters of an operating system installed on the client device, a first unique device identifier, a second unique device identifier and a phone number associated with a Subscriber Identity Module (SIM) card of the client device, client device capabilities and dynamic status information.

In various instances of the aforementioned server-side processing embodiments in which content and/or the format of content delivered to a client application is customized, the location information may include, but is not limited to, one or more of (i) latitude, longitude and altitude data provided by a Global Positioning System (GPS) receiver associated with the client device, (ii) absolute location data provided by the GPS receiver, and (iii) location data provided by a cell tower signal, Wi-Fi or Wi-Max access point or any other location determining technology resident on or communicatively coupled with the client device.

In various instances of the aforementioned server-side processing embodiments in which content and/or the format of content delivered to a client application is customized, the HTTP header fields may be request-header fields associated with a predefined user-agent request-header field value.

In various instances of the aforementioned server-side processing embodiments in which content and/or the format of content delivered to a client application is customized, the client application may be an HTTP browser.

In various instances of the aforementioned server-side processing embodiments in which content and/or the format of content delivered to a client application is customized, the client device may be a mobile device or a general purpose device that is designed to connect to the Internet.

In various instances of the aforementioned server-side processing embodiments in which content and/or the format of content delivered to a client application is customized, the resource may be identified by way of a Uniform Resource Identifier (URI).

Other embodiments of the present invention provide, various client-side processing associated with receiving content wherein one or more of the content and a format in which the content is received is customized. Responsive to end user interaction with a client device running a client application, an augmented HyperText Transport Protocol (HTTP) request to be processed by a server is generated. The augmented HTTP request identifies a resource and indicates a desired action to be performed on the identified resource. The client application inserts personalization information, including, but not limited to, one or more of (i) personal and preference information regarding an end user of the client device, (ii) device information regarding capabilities or characteristics of the client device and (iii) location information indicative of a geographical location of the client device, into the one or more HTTP header fields associated with the augmented HTTP request. Responsive to the augmented HTTP request, the client application receives content associated with the identified resource in which one or more of the content and a format in which the content is received are customized based on the personalization information.

In the aforementioned client-side processing embodiment in which one or more of the content and a format in which the content is received is customized, the personal and preference information may include, but is not limited to, personally identifying data, personal interest data and/or demographic data.

In various instances of the aforementioned client-side processing embodiments in which one or more of the content and a format in which the content is received is customized, the device information may include, but is not limited to, characteristics, settings or parameters of an operating system installed on the client device, a first unique device identifier, a second unique device identifier and a phone number associated with a Subscriber Identity Module (SIM) card of the client device, client device capabilities and/or dynamic status information.

In the context of various of the aforementioned client-side processing embodiments in which one or more of the content and a format in which the content is received is customized, the location information may include, but is not limited to, (i) latitude, longitude and altitude data provided by a Global Positioning System (GPS) receiver associated with the client device, (ii) absolute location data provided by the GPS receiver, and/or (iii) location data provided by a cell tower signal, Wi-Fi or Wi-Max access point and any other location determining technology resident on or communicatively coupled with the client device.

In the context of various of the aforementioned client-side processing embodiments in which one or more of the content and a format in which the content is received is customized, the HTTP header fields may be request-header fields associated with a predefined user-agent request-header field value.

In various instances of the aforementioned client-side processing embodiments in which one or more of the content and a format in which the content is received is customized, the insertion of personalization information may be performed selectively on a field-by-field basis in accordance with configured preferences set within the client application.

In various instances of the aforementioned client-side processing embodiments in which one or more of the content and a format in which the content is received is customized, the client-side processing may further involve encrypting and compressing the personalization information prior to transmission to the server and allowing for multiple encryption and compression techniques.

In various instances of the aforementioned client-side processing embodiments in which one or more of the content and a format in which the content is received is customized, the client application may be an HTTP browser.

In various instances of the aforementioned client-side processing embodiments in which one or more of the content and a format in which the content is received is customized, the client-side processing may further involve responsive to the augmented HTTP request, the client device receiving an augmented HTTP response including menu information intended to facilitate interaction with the identified resource by the HTTP browser and dynamically and programmatically configuring a menu structure of the HTTP browser based at least in part upon the menu information.

In various instances of the aforementioned client-side processing embodiments in which one or more of the content and a format in which the content is received is customized, the client device may be a mobile device or an Internet enabled device.

In various instances of the aforementioned client-side processing embodiments in which one or more of the content and a format in which the content is received is customized, the resource may be identified by way of a Uniform Resource Identifier (URI).

Other features of embodiments of the present invention will be apparent from the accompanying drawings and from the detailed description that follows.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 8A and FIG. 8B are simplified examples of an augmented HTTP request in accordance with an embodiment of the present invention.

FIG. 8C is an example of an Add Request Headers API function that can be implemented by a third-party client application according to one embodiment of the present invention.

FIG. 8D is an example of an API input parameters structure according to one embodiment of the present invention.

FIGS. 8E-8H are coding examples for adding custom request headers according to one embodiment of the present invention.

FIG. 9A is an example of an augmented HTML file in accordance with an embodiment of the present invention.

FIG. 9B illustrates the effect of the augmented HTML file of FIG. 9A on the browser menu structure of a mobile device in accordance with an embodiment of the present invention.

DETAILED DESCRIPTION

Figure 1:
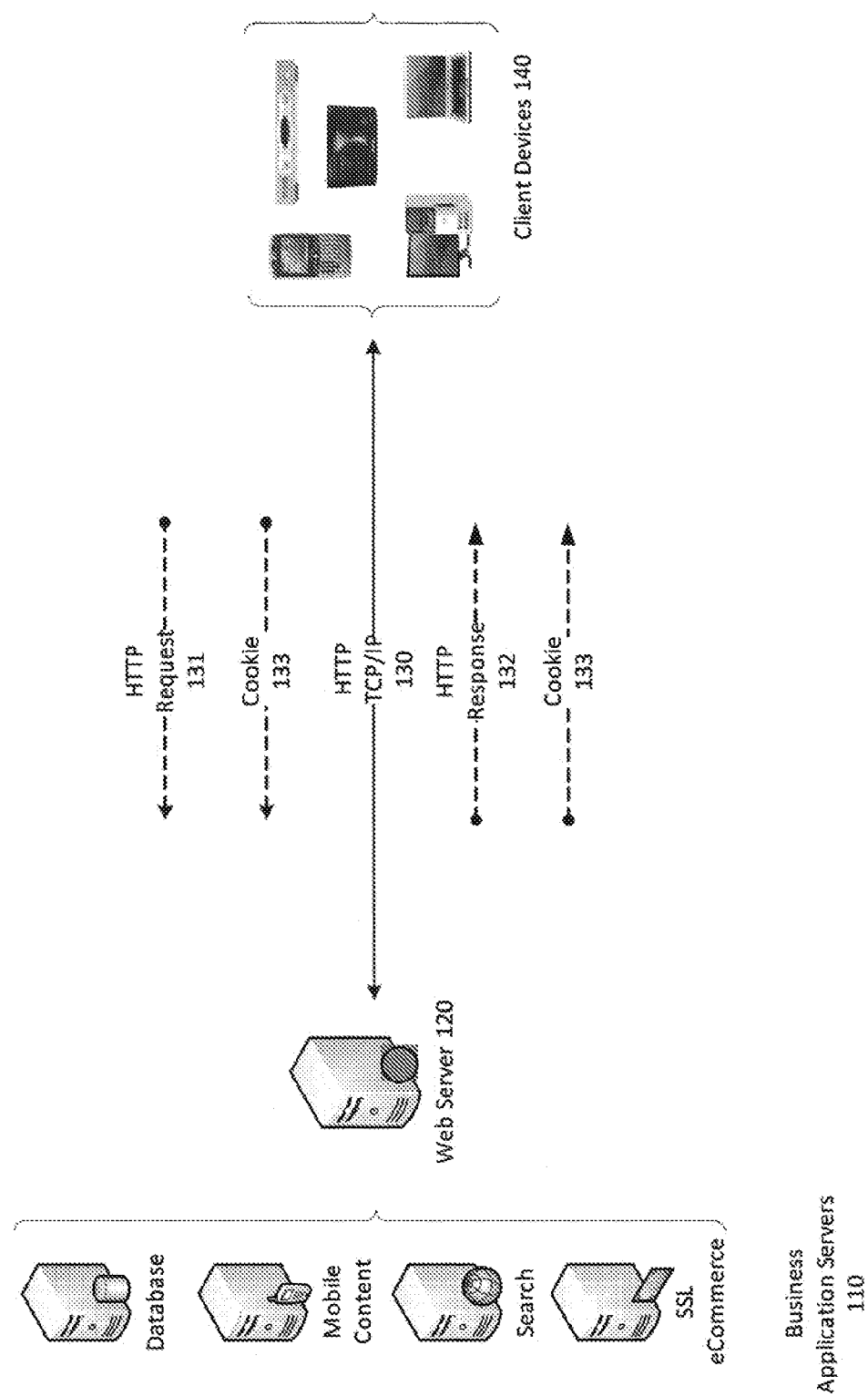
FIG. 1 is a conceptual illustration of the current communication convention used by HyperText Transport Protocol (HTTP) clients and HTTP servers.

Systems and methods are described for enabling the exchange and usage of contextual information among web-enabled clients and servers. According to one embodiment, contextual information, e.g., dynamic state information, is aggregated, stored and protected on a client device. The contextual information may then be transmitted to a web server for the purpose of allowing the web server to customize content and/or the format of content delivered to the client device. Separately, independently and/or based upon contextual information from a client device, contextual information, e.g., dynamic contextual menu information, may be provided to the client device to enable the client device to present contextual menus to facilitate end-user interaction with a particular application or web service.

In one embodiment of the present invention, web-connected devices securely interact with web servers based on information regarding who (e.g., the user), what (e.g., the device), where (e.g., the global positioning system (GPS) location, Wi-Fi, cell tower) and when (e.g., time) over any carrier or network while also protecting the privacy of the users. According to various embodiments of the contextual data communication platform described herein, software components distributed between a web-enabled client and a web server use existing Internet standards to cost-effectively deliver business critical location, device and user data from web-enabled client devices, such as Smartphones, Pocket Personal Computers (PCs), Ultra Mobile PCs (UMPCs), BlackBerry® wireless handheld devices, iPhones, desktop/laptop computers, set top boxes and the like, to a web server over any web connection. Relevant portions of this who, what, where and when data can then be distributed in real-time to any application or service to enhance the user experience. (5o9 is a registered trademark of 5o9, Inc. of Boulder, Colo.).

As a result of the device-, user- and location-awareness provided to content and service providers by embodiments of the present invention, numerous data usage models, such as local search, local advertising, location-based services, mobile asset and policy management, mobile content, personalized content and the like, become feasible. For example, a novel permission-based proximity marketing approach (Pushing with Permission) provides users with control over their data privacy, reduces data entry and increases relevant interactions. As one potential permission-based marketing scenario, Taco Bell may perform a drive time promotion in which customers who give Taco Bell permission to contact them on their Pocket PC will receive a notice when they are within five miles of a Taco Bell offering them a free taco when they buy two if they come by the drive thru window within a designated time frame. As described further below in the context of various exemplary use cases, a user may provide a service provider (e.g., Taco Bell) with permission to solicit them by making available selective who, what and/or where data to the service provider. For purposes of illustrating the versatility of various embodiments of the contextual data communication platform, additional use cases and examples are described below.

In one embodiment, by way of newly available email security/data access policy management, organizations with sensitive information or that must meet regulatory compliance standards for data release and distribution can now address the unique challenges of mobile users. The user, their location, the device they are on and in some cases, the network or software they are using to connect to the Internet may be used to determine what networks or data may be accessed or sent via email.

In accordance with various embodiments, mobile asset tracking can be provided to allow organizations with the ability to instantly know where field or traveling employees are or to locate missing or stolen GPS-enabled mobile devices. For example, server-initiated calls can instantly provide an asset management, HR system or database with identifying device, user and location data. Additionally, client software can be "locked-down" to ensure unauthorized users cannot turn GPS data off.

According to one embodiment of the present invention, home/away profiles are enhanced. For example, the client may be customized to allow employees with non-GPS enabled mobile devices to change their settings for frequently visited locations. Single-click controls may also simplify the process, thereby increasing field policy compliance and productivity.

In the following description, for the purposes of explanation, numerous specific details are set forth in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, MultiMedia Cards (MMCs), secure digital (SD) cards, such as miniSD and microSD cards, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

While, for convenience, various embodiments of the present invention may be described with reference to hand-held, mobile devices or phones, the present invention is also applicable to various other Web-enabled devices (mobile or fixed), such as laptop and/or desktop computers and the like. Embodiments of the present invention described herein may be installed on any device that transmits data via HTTP, such as Desktop Computers, Laptops, Mobile Phones, Smartphones, Pocket PCs, PDAs, Video Phones, Ultra Mobile PCs (UMPCs), hand-held computers, Appliances (such as refrigerators, washers), consumer electronics devices (such as game consoles TVs, set-top boxes, home media centers, DVRs, stereos, digital audio and video players/recorders), military hardware (walkie talkies, satellite phones, tanks, remote vehicles, scanners), vehicles (automobiles, aircraft, space craft, trains, buses) and other devices (e.g., seismic or other environmental sensors and robots) and the like. Additionally, a pure software embodiment is envisioned for client devices in which all or a subset of the features described below may be implemented.

For the sake of illustration, various data and business use cases are described herein to illustrate exemplary applications of the novel contextual data communication platform. Importantly, such example data and use cases are not intended to be limiting as the software infrastructure and flexible data communications and transport mechanisms described herein enable and facilitate an indescribably vast assortment of new and improved web services and applications.

Furthermore, while embodiments of the present invention are described with reference to the ability to support the current Internet infrastructure without change to the specifications, such as RFC 2616, via the use of new User_Agent fields within headers of the HTTP protocol, it is contemplated that various aspects of this mechanism of communicating "Me data" can be replaced and/or supplemented by information injected into the HTTP data stream, wireless/telecom carrier signaling or Internet Service Provider (ISP) signaling, modified Internet infrastructure specifications or future web protocols. All such methods of transmitting "Me data" between web-connected clients and servers are intended to be encompassed by the present application.

Finally, while embodiments of the present invention are described with reference to particular data being embedded in HTTP protocol headers, in one embodiment, open application programming interfaces (APIs) are provided to allow developers to extend the HTTP protocol in other novel ways to transport other types of data using customizable User_Agent fields.

Terminology

Brief definitions of terms, abbreviations, and phrases used throughout this application are given below.

The phrase "augmented HyperText Transport Protocol request" or "augmented HTTP request" generally refer to an HTTP request supplemented to include information relating to one or more of location information, device data, terminal capabilities, operating system capabilities, user data and time information. In one embodiment, augmented HTTP requests carry "Me data." According to one embodiment, an augmented HTTP request includes one or more customized User_Agent header fields containing (i) information regarding who the user is (e.g., personally identifying data (such as, but not limited to names, addresses, phone numbers, email addresses, social security number (SSN), national ID number, employee number and credit card account information), personal interest data (such as, but not limited to, food, music, leisure, technology, entertainment preferences, personal advertising preferences, social networking preferences) and demographic data (such as, but not limited to age, gender, income, spending, employment, profession, household income, education level, number of children, number of people in the household, marital status, sexual orientation, political affiliation, ethnicity, group memberships, etc.); (ii) what the client device and/or terminal capabilities are (e.g., screen resolution, color capabilities, accepted compression, audio and video formats, etc.); (iii) information indicating where the client device is, such as, but not limited to real-time GPS location of the client device from which the request originated; other static or dynamic state information associated with the client device (such as, but not limited to, screen orientation, a device ID (e.g., the unique PIN number of a BlackBerry device), whether the client is a real device or simulator, whether the device is holstered or not at the time of the request), and state information associated with external or internal sensors or monitors, including, but not limited to gyro status, humidity, temperature, etc.

The phrase "augmented HyperText Markup Language file" or "augmented HTML file" generally refer to an HTML file supplemented to include information regarding a menu structure to be presented on the client device to which the augmented HTML file is directed. According to one embodiment, the information regarding the menu structure received in the augmented HTML file is used to dynamically reconfigure the menu information/structure presented by the operating system and/or an application running on the client device. Advantageously, in this manner, many dynamic contextual menu usage models are enabled. In one embodiment, dynamic browser menus of a mobile device are driven from a web server.

The term "client" generally refers to a requesting program, process or device in a client/server relationship. For example, a Web browser is effectively making client requests for pages from servers all over the Web. The browser itself is a client in its relationship with the computer that is getting and returning the requested markup language file (e.g., HTML/XML/XHTML file). The computer handling the request and sending back the markup language file is functioning as server with respect to the Web browser. Notably, a device typically thought of as a client device may also function as a server and may concurrently operate as both a client and a server with respect to other devices to which it is communicatively coupled.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrase "HyperText Transport Protocol Mobile" or acronym HTTPM generally refer to a mobile sockets layer added to the HTTP protocol (similar in concept to HTTPS) that allows Web servers to recognize Web enabled devices.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The phrases "Multiple Target HyperLink," "Multiple Target Hyper Linking" or acronym MTHL generally refer to a method for allowing a one-to-many, versus the current one-to-one, relationship among a hyperlink and the actual Uniform Resource Locators (URLs) to which it connects.

The phrases "Me data," "Me information," "contextual data," "contextual information," "dynamic state information" and the like generally refer to information regarding who the user is (e.g., name, address, phone number, gender, personal advertising preferences, social advertising preferences, the skill level of the user with respect to one or more web services or applications (e.g., novice, expert, etc.)), what the client device, operating system and/or terminal capabilities are (e.g., screen resolution, color capabilities, accepted compression, etc.), where the client device is (e.g., GPS, Zip/postal code, Bluetooth, Wi-Fi, area code, country, near field communications, radio frequency ID (RFID), cell tower triangulation, device, virtual location—hyperlinks any other method of determining location and/or when (e.g., time).

The phrase "protected fields" generally refers to the ability to selectively enable or disable the transmission of information, such as Me data, via a web connection. In one embodiment, protected fields provide the underpinnings of a privacy-based user interface which supports the concept of Pushing with Permission. In one embodiment, protected fields technology is executed via a user-controlled identification (e.g., the ability to check/uncheck data fields) versus tracking approach to sharing content, services and advertising personalization (who, what & were) data.

The term "responsive" includes completely or partially responsive.

The term "server" generally refers to a responding program, process or device in a client/server relationship. For example, a web server responds to client (e.g., web browser) requests for pages from web-connected clients. The web server itself is a server in its relationship with the computer or program that is making requests for markup language files (e.g., HTML/XML/XHTML files) and does not assume any particular hardware or device form factor. The computer or program making the requests is functioning as a client with respect to the web server. Notably, a device typically thought of as a server device may also function as a client and may concurrently operate as both a client and a server with respect to other devices to which it is communicatively coupled. Consequently, depending on the context, when the phrase client-server is used herein it may also encompass peer-to-peer functionality as well.

Technical Background

At its core the Internet is designed to function in a client-server mode. The governing body, the World Wide Web Consortium (W3C), designed a set of specifications that allow data to traverse the Internet interacting between the web server and the browser. This document known as RFC 2616 discusses the communication protocol in use today, i.e., Hypertext Transfer Protocol (HTTP).

HTTP is a method used to transfer or convey information on the World Wide Web. Its original purpose was to provide a way to publish and retrieve Hyper Text Markup Language (HTML) pages. Development of HTTP was coordinated by the W3C and the Internet Engineering Task Force (IETF), culminating in the publication of a series of RFCs, most notably RFC 2616 (1999), which defines HTTP/1.1, the version of HTTP in common use today and which is hereby incorporated by reference herein for all purposes.

HTTP is a request/response protocol between clients and servers. The originating client, such as a web browser, spider, or other end-user tool, is referred to as the user agent. The destination server, which stores or creates resources such as HTML files and images, is called the origin server. In between the user agent and origin server may be one or more intermediaries, such as routers, network appliances, proxies, gateways, firewalls and the like.

FIG. 1 is a conceptual illustration of the current communication convention used by HTTP clients and HTTP servers. Before describing the various innovations and features of embodiments of the present invention, it is thought to be helpful to provide a bit of background regarding the current mechanism used for communicating static client state information to web servers and related drawbacks and limitations of the current approach.

In this example, an HTTP client running on one of client devices 140 initiates an HTTP request 131 by establishing a Transmission Control Protocol (TCP) connection to a particular port on a web server 120 (port 80 by default). An HTTP server listening on that port waits for the HTTP client to send the HTTP request 121. Upon receiving the HTTP request 132, the web server 120 sends back an HTTP response 132, including a status line, such as "HTTP/1.1 200 OK", and a message of its own, the body of which is perhaps the requested file, an error message, or some other information.

HTTP can occasionally pose problems for web developers (Web Applications), because HTTP is stateless. (A stateless server is a server that treats each request as an independent transaction that is unrelated to any previous request.) The advantage of a stateless protocol is that hosts don't need to retain information about users between requests, but this forces the use of alternative methods for maintaining users' state, for example, when a host would like to customize content for a user who has visited before.

The common method used by current technology for solving this problem of statelessness involves the use of sending and requesting cookies, such as cookie 133, in an attempt to add state. However, cookies have many disadvantages. Cookies are an incomplete solution as they are not compatible with all devices, they are not adaptable to varying usage models and the information conveyed is not protectable. In addition, cookies create privacy concerns, have technical drawbacks, including, among other things, misidentification of users and the capability of being misused in the context of security attacks.

HTTP cookies, sometimes known as web cookies or just cookies, are parcels of text sent by a server to a web browser and then sent back unchanged by the browser each time it accesses that server. HTTP cookies are used for authenticating, tracking, and maintaining specific information about users, such as site preferences and the contents of their electronic shopping carts.

Cookies have been of concern for Internet privacy, since they can be used for tracking browsing behavior. As a result, they have been subject to legislation in various countries such as the United States and in the European Union. Cookies have also been criticized because the identification of users they provide is not always accurate and because they could potentially be used for network attacks. Some alternatives to cookies exist, but each has its own drawbacks.

Cookies are also subject to a number of misconceptions, mostly based on the erroneous notion that they are computer programs. In fact, cookies are simple pieces of data unable to perform any operation by themselves. In particular, they are neither spyware nor viruses, despite the detection of cookies from certain sites by many anti-spyware products.

Cookies are used by web servers to differentiate users and to operate in a way that depends on the user. Cookies were invented for realizing a virtual shopping basket: this is a virtual device in which the user can "place" items to purchase, so that users can navigate a site where items are shown, adding or removing items from the shopping basket at any time. Cookies allow for the content of the shopping cart to depend on the user's actions.

Allowing users to log in to a web site with a username and password is another use of cookies. Users typically log in by inserting their credentials into a login page; cookies allow the server to know that the user is already authenticated, and therefore is allowed to access services or perform operations that are restricted to logged-in users.

Several websites also use cookies for personalization based on users' preferences. Sites that require authentication often use this feature, although it is also present on sites not requiring authentication. Personalization includes presentation and functionality. For example, the Wikipedia web site allows authenticated users to choose the webpage skin they like best; the Google search engine allows users (even non-registered ones) to decide how many search results per page they want to see.

Cookies are also used to track users across a website. Third-party cookies and web bugs also allow for tracking across multiple sites. Tracking within a site is typically done with the aim of producing usage statistics, while tracking across sites is typically used by advertising companies to produce anonymous user profiles, which are then used to target advertising (deciding which advertising image to show) based on the user profile.

Having now briefly explained the state-of-the-art in connection with attempting to use state information on the web as well as numerous disadvantages and limitations associated with current conventions for web connections, the improvements provided by embodiments of the present invention will now be better understood.

Summary of Various Features of Embodiments of the Present Invention

Embodiments of the present invention seek to address or at least alleviate various problems with current conventions for web connections by providing one of more of the following features:

The ability to aggregate, store and protect contextual data on a client device.

The ability to transmit contextual data, including user's state information, while allowing the user to retain control of their privacy.

The ability to transmit any kind of data either static or dynamic using the HTTP protocol and the HTTP headers.

The ability to transmit contextual information to a client device based upon which the client device may display contextual menus.

The ability to transmit any kind of data from a web server to a client device using augmented HTML files.

The ability to personalize content and/or the format in which it is delivered to the client device based on the contextual data provided by the client device.

The ability to provide a contextual data communication platform without a change to the specifications (RFC 2616)

The ability to optimize data transfer or transmission using different compression algorithms within a single software solution In accordance with various embodiments of the present invention, the features listed above are provided by way of one or more of the following technological enhancements, which are described in further detail below:

1. Client-side browser helper object and control panel application which can interface with all standard HTTP browsers and facilitate, among other things, the injection of dynamic contextual state information into the HTTP protocol and the presentation of dynamic contextual menus on the client device responsive to tagged data sent by the web server.

2. Web Server modules, which extract and distribute the dynamic state information to appropriate information servers and embed contextual menu information in augmented HTML files.

3. New User_Agent fields (data fields), which identify the Me data on the HTTP protocol—can be injected into the outgoing HTTP header stream leaving the browser and pass across the web until they reach the server where they are decrypted and passed to the back-end applications via Common Gateway Interface (CGI). Alternatively, it can be passed to script interpreters, such as Mod_Perl or Active Server Pages (ASP), for processing.

4. Adaptive Compression Architecture—the ability to support and manage with rule sets, multiple compression CODECs, such as Gzip, Bz2 and the like, within one client-server application.

5. HTTPM—a layer to the HTTP protocol (similar in concept to HTTPS) that allows the Web server to recognize a mobile device.

6. MTHL (Multiple Text HyperLink)—The method for allowing a one-to-many, versus the current one-to-one relationship between a hyperlink and the actual URL's it connects to.

7. Entity Properties Interface (EPI): This is the ability to find, share, combine, optimize and transport data over HTTP to a web server and then distribute that data to any application via a CGI or other back-end process.

8. Mobile Aware Development Platform: The systems, methods and infrastructure described herein enable applications with the ability to export function addresses to become mobile aware to a web server.

9. Bi-Directional Communications
   a. On-device bidirectional communication of Me data between the mobile aware development platform and other resident applications.
   b. Adaptive Messaging Architecture initiates bi-directional communications across HTTP—effectively allowing the server to request more information from the client before completing the transaction.

Background Information Regarding Who, What and Where

Before discussing various implementation details of various embodiments of the present invention, it is thought to be useful to provide background information regarding various forms of contextual data that may be transmitted from a client device to a web server.

A first form of contextual data that may be transmitted to a web server is personal information, such as user identification information—"who" information. User identification is critical to efficient mobile Internet communications. Filling out a Web form on a Smartphone or Pocket PC is slow and frustrating and restricts mobile commerce. In accordance with one embodiment of the present invention, a solution is one or more databases of "Me" information. For example, one or more encrypted data files, which provide information regarding device capabilities, operating system capabilities and other personal data that the user is willing to share may be stored on the device. Such Me information may then allow a device to authenticate the user with Web servers, without sending personal information over the Web. The Me information may be used to fill out forms and remember what kind of information or advertising the user is willing to accept. This level of personalization enables widespread use of online CRM, e-commerce and permission-based marketing. By delivering information in a personalized, appropriately formatted manner, content providers can deliver greater relevance and value to customers, leading to enhanced service levels, increased loyalty, and improved revenues.

A second form of contextual data that may be transmitted to a web server includes information regarding device, operating system and terminal capabilities—"what" information. The assumption has always been that a desktop PC is the device connected to the Internet or server. This is no longer the case. As a result, in accordance with various embodiments of the present invention, mechanisms are provided to allow web-connected devices to transmit their capabilities, such as screen size, color display, operating system capabilities and content acceleration capabilities. While a handful of very large web sites can determine if it's a mobile device making a request, the vast majority cannot. And knowing what, only addresses content format, not acceleration or encryption capabilities, remaining battery life, or device health. By marrying who and what together, the user can authenticate to the device first rather than the remote server—turning authentication into a single-step, no-entry process, which saves time, reduces keystrokes, and eliminates the need to send passwords, logins and other sensitive data over the web. With some mobile devices already including fingerprint readers or other biometric devices, the synergies of who and what together creates a more trusted mobile Internet.

A third form of contextual data that may be transmitted to a web server includes information regarding the client device's current location—"where" information. Mobile computing has changed the Internet landscape. Not only are the device capabilities different, buy they are now free to roam. There are many emerging markets where people do not have a PC and will never own one. This directly impacts one of the most popular applications on the Internet—namely Search. Search on a desktop is about browsing. Search on a mobile device is about finding. Knowing the location of a mobile device is a critical determiner of the quality of the results. For instance a mobile search for Pizza Huts should be able to accurately locate all the Pizza Hut stores within walking or delivery distance of the user's current location. The ability to correlate this data with both "What Am I" (what type of device the request originated from) and "Who Am I" (relevant information regarding the end user of the device) allows for the desired customer experience. No more frustration.

Figure 2:
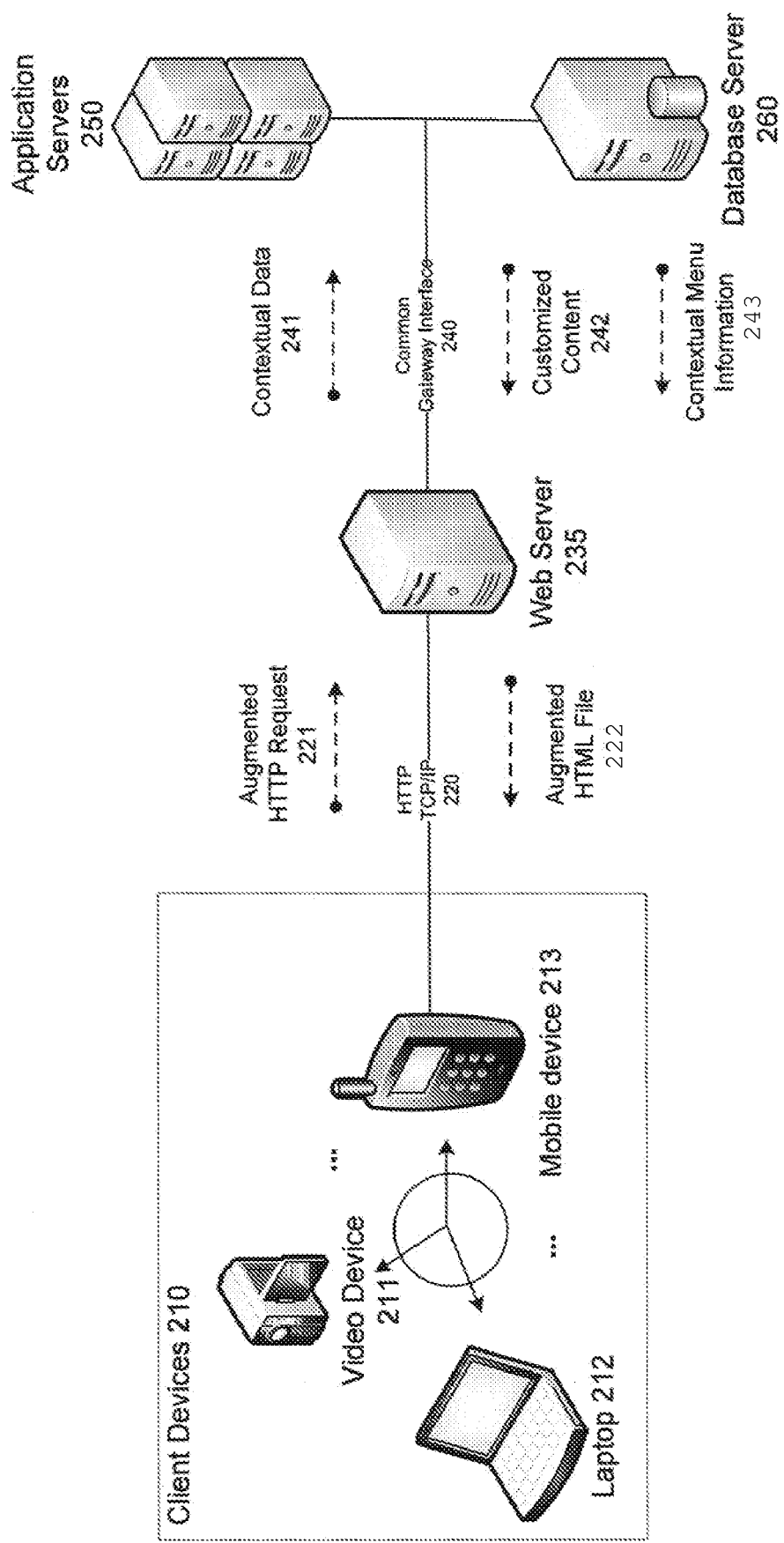
FIG. 2 is a high-level block diagram conceptually illustrating a communication convention among client devices and a web server in accordance with an embodiment of the present invention.

With this background in mind, a high-level view of a contextual data communication platform will now be described with reference to FIG. 2. FIG. 2 conceptually illustrates a new communication convention among client devices 210 and a web server 235 in accordance with an embodiment of the present invention. Notably, the new communication convention provides for the ability on the part of client devices 210 to transmit dynamic state information to a web server 235. Information servers, such as application servers 250 and/or database server 260 may then customize the output intended to be returned to client devices 210 based on the contextual data provided by the client devices 210. The new communication convention also independently provides the information servers with the ability to return contextual information to the client devices 210. In some embodiments, the contextual information provided by an information server to a client device is for the purpose of facilitating the client device's interactions with the information server. For example, in one embodiment, the web server 235 may return on behalf of the information servers tagged data indicative of desired menu entries to be displayed on a client device. Such menu entries may enable more efficient navigation or interaction with the information server. Thus, in accordance with embodiments of the present invention, client devices 210 may provide contextual data to information servers and/or web servers and webs servers and/or information servers may separately, independently and/or responsive thereto provide contextual information to client devices.

In the present example, client devices 210 interact with the web server 235 via a communications medium 220 that supports HTTP over TCP/IP. Client devices 210 access applications and web services provided by application servers 250 and database server 260 via the web server 235. While in the present example, for sake of illustration, only three types of client devices 210, i.e., a video device 211, a laptop 212 and a mobile device 212, are shown, it is to be understood that client devices 210 may include any web-enabled client device.

Responsive to navigation requests by end users or applications, in addition to conveying information identifying a web resource and a desired action to be performed on the identified web resource, the client devices 210 also transmit static or dynamic state information to web server 235 embedded within augmented HTTP requests, such as augmented HTTP request 221. Briefly, this state information may represent any information observable or otherwise available to the client device, such as the current temperature, the location of the client device and the end user's blood pressure or heart rate. As described in further detail below, server-side functionality within the web server 235 extracts the state information and conveys it directly or indirectly to the information server (e.g., application servers 250 or database server 260) responsible for handling requests relating to the web resource identified in the augmented HTTP request 221 as contextual data 241.

Based on one or both of the contextual data 241 and the application or web service being accessed by the augmented HTTP request 221, the responding information server (e.g., application servers 250 or database server 260) may customize the content to be returned to the requestor by providing customized content 242 to the web server 235. Typically, the task of such an information server is to respond to requests (in the case of web servers, requests from client web browsers) by returning output. Each time a request is received, the server analyses what the request asks for, and returns the appropriate output. The two simplest ways, for the server, of doing this are (i) if the request identifies a file stored on disk, return the contents of that file; and (ii) if the request identifies an executable command and possibly arguments, run the command based on the provided arguments and return the corresponding output. Common gateway interface (CGI) protocol 240 defines a standard way of doing the latter. CGI defines how information about the server and the request is passed to the command in the form of arguments and environment variables, and how the command can pass back extra information about the output (such as the type) in the form of headers. How web server 235 passes contextual information 241 in the form of exemplary environment variables, according to one embodiment of the present invention, is described further below.

As described further below, the responding server may also provide contextual menu information 243 to the requesting client device. Notably, in various embodiments, contextual menu information 243 may take into consideration and be at least in part based on or responsive to contextual data 241. In other embodiment, contextual menu information 243 is provided independent of contextual data 241 and/or the existence of contextual data 241. The contextual menu information 243 typically specifies a menu structure to facilitate ongoing interaction with the current application or web service by the requesting client device. In this manner, context dependent menu structures may be presented on a mobile device screen to shift navigation off the web page and into a browser menu or operating system menu, as the case may be. Advantageously, in this manner, web pages, applications and web services may be provided with the data and screen space they need to deliver relevant content. Meanwhile, mobile users are provided with a consistent and familiar menu interface—minimizing training and support costs.

As described in further detail below, when present, server-side functionality within the web server 235 extracts the contextual menu information 243 and embeds the contextual menu information 243 within an augmented HTML file 222. In one embodiment, client-side functionality within the client devices 210 is configured to strip out the embedded contextual menu information prior to rendering the HTML.

Figure 3:
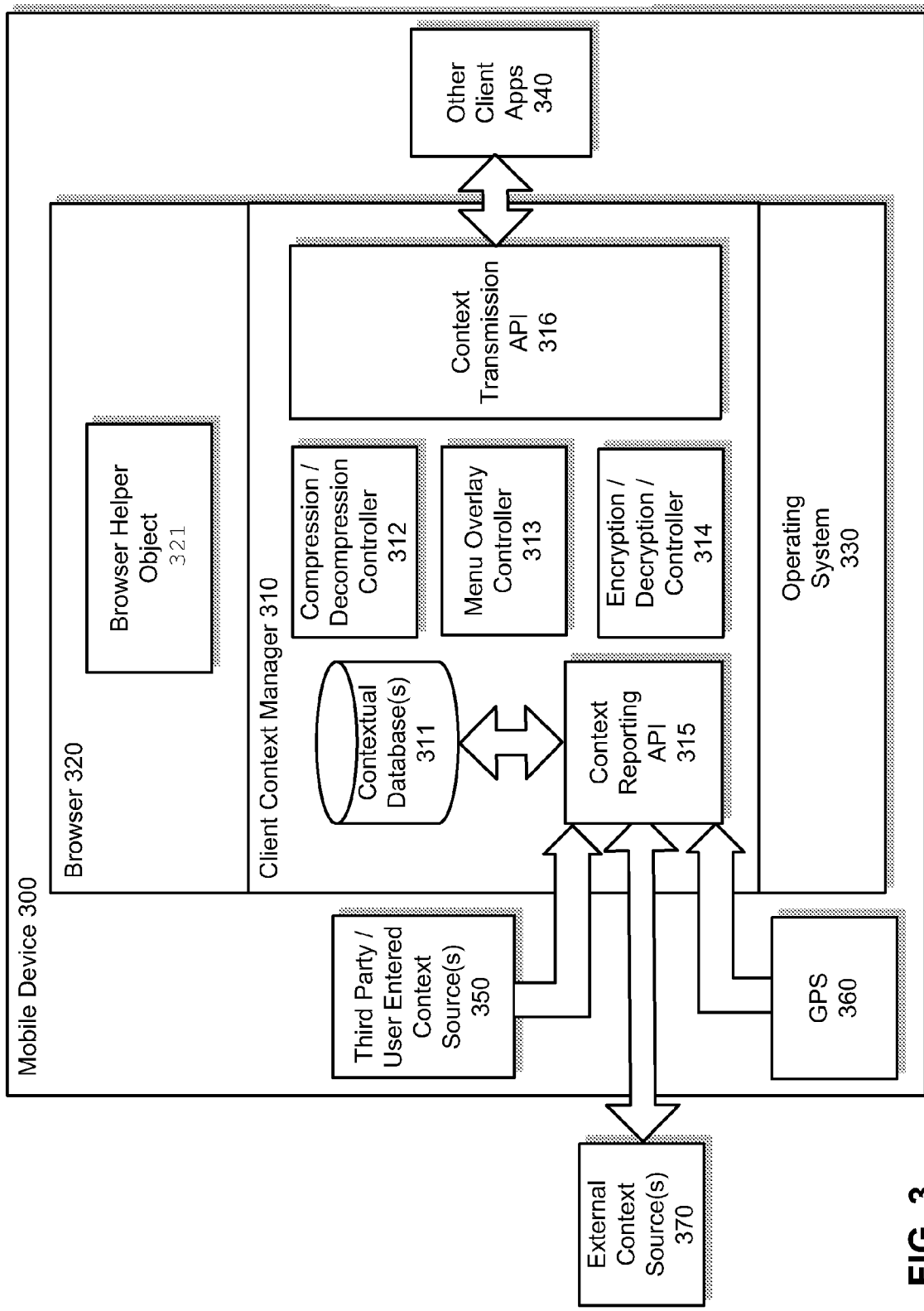
FIG. 3 is a simplified block diagram conceptually illustrating the interactions of various functional units of a mobile device in accordance with an embodiment of the present invention.

FIG. 3 is a simplified block diagram conceptually illustrating the interactions of various functional units of a mobile device 300 in accordance with an embodiment of the present invention. In the present example, mobile device 300 includes a browser 320, a client context manager 310 and an operating system 330.

Browser 320 may be a Microsoft Internet Explorer web browser, such as Internet Explorer Mobile or IE Mobile (formerly referred to as Pocket Internet Explorer or PIE) or other mobile browser, capable of connecting to the web via a cellular network or via wireless local area network—(Wi-Fi) or wide area network (Wi-Max) or other means of connectivity using standard HTTP over TCP/IP. Browser 320 may display web pages written in HTML, XHTML Mobile Profile (WAP 2.0), WML (WAP 1.3) and the like.

According to one embodiment browser 320 includes a browser helper object 321 (or MIME filter) through which client context manager 310 may interface with browser 320. Browser helper object 321 (BHO) may be is a Dynamic Link Library (DLL) module designed as a plug-in for Microsoft's Internet Explorer web browser to provide added functionality. In one embodiment, BHO 321 intercepts web content and provides it to client context manager 310 for processing before rendering the associated HTML.

According to the present example, client context manager 310 includes one or more contextual databases 311, a compression/decompression controller 312, a menu overlay controller 313, an encryption/decryption controller 314, a context reporting application programming interface (API) 315 and a context transmission API 316. In one embodiment, client context manager 310 functions as a filter and is implemented in accordance with the Document Object Model (DOM) programming interface specification.

The contextual database(s) 311 may locally store encrypted contextual data, such as information and/or parameters regarding the end-user of the client device, the client device capabilities, terminal capabilities, operating system capabilities, and other third party or user entered data. In one embodiment, contextual database(s) 311 represent one or more extensible, secure databases that run as self contained executable programs on top of the device's target operating system. In the present example, the purpose of contextual database(s) 311 is to collect and store context data from "N" input sources (not shown), e.g., bio-fingerprint reader, GPS, Heart Rate Monitor, Bluetooth devices. According to one embodiment, all of the available context data is stored and updated in real time. Essentially, the contextual database(s) 311 offers a programmer a safe storage location indicating the current state of the target device. As discussed further below, in one embodiment, each field of data that is stored within the database can be individually protected as well as the database itself.

According to one embodiment the contextual database(s) 311 are extensible to accommodate third-party applications (e.g., databases for storing and aggregating additional data) via a set of open APIs. For example, at run time the contextual database(s) 311 may scan its current directory looking for third-party databases which have appropriate APIs activated. These APIs, which are callable by the contextual database(s) 311, allow programmers to add specific Who, What, and Where information to the web from within their application. This information may then be aggregated along with other information from the contextual database(s) 311 and passed to the browser (not shown) for transport to the web server 235.

According to one embodiment, end-user information may include personally identifying data (such as, but not limited to first and/or last name, address information (e.g., a street address of a residence of the end user, a city in which the residence is located, a state in which the residence is located, a ZIP Code in which the residence is located, a country in which the residence is located), one or more phone numbers (e.g., a home phone number, a cell phone number, such as a phone number associated with a Subscriber Identity Module (SIM) card of the client device, or a work phone number), one or more email addresses, social security number (SSN), national ID number, employee number and credit card account information), personal interest data (such as, but not limited to, food, music, leisure, technology, entertainment preferences, personal advertising preferences, social advertising preferences), demographic data (such as, but not limited to age, gender, income, spending, employment, profession, household income, education level, number of children, number of people in the household, marital status, sexual orientation, political affiliation, ethnicity, group memberships, etc.), a language in which the end user would prefer information to be presented, passwords, loyalty program account information, etc.

In one embodiment device and terminal capabilities include, but are not limited to, screen resolution, color capabilities, accepted compression, audio and video formats, etc.

According to various embodiments of the present invention, operating system capabilities include, but are not limited to, the operating system's ability to provide information regarding the client device battery level, battery status, battery temperature, battery voltage, device ID, device name, idle time, operating system version, platform version, user interface mode (e.g., beginner, intermediate, advanced), whether the battery is removable, whether the device is "holstered," whether the device is a simulator, the current font being used by the user interface and/or the fonts available.

In one embodiment, contextual data may be periodically polled (pulled) from various internal and/or external sources, such as third party or user entered context source(s) 350, global positioning system (GPS) receiver 360 and external content source(s) 370, and aggregated and stored within contextual database(s) 311.

In one embodiment, the context reporting API 315 may be called by context sources when new information is available. Alternatively, outwardly facing calls may be made by the client context manager 310. For example, the context sources may implement standardized routines that may be called by client context manager 310 whenever client context manager 310 desires to have up-to-date context data (e.g., prior to sending an augmented HTTP request responsive to a navigation request by the end user or other client applications 340) from such context sources.

Similarly, other client applications 340 installed on the mobile device 300 may call an appropriate routine within the context transmission API 316 when they have context data they would like to transmit to a web server as part of a navigation request. Or, the other client applications 340 may implement standardized routines (as described further below) that may be subject to outward facing calls by client context manager 310 prior to sending an augmented HTTP request on behalf of such applications.

In one embodiment, compression/decompression controller 312 contains the current compression and decompression libraries. According to various embodiments, the compression and decompression libraries may be augmented by third parties. Depending on whether or not compression/decompression is required these library routines are called by the browser helper object, for example.

Similarly, the encryption/decryption controller 314 contains the current encryption and decryption libraries, which may also be augmented by third parties. Depending on whether or not encryption/decryption is required these library routines are called by the browser helper object, for example.

According to various embodiments, menu overlay controller 313 is configured with hooks into the operating system 330 and/or the browser 320 as appropriate to respond to menu interactions by the end user. In one embodiment, and as described further below, menu overlay controller 313 extracts contextual menu information, such as contextual menu information 243 inserted into an augmented HTML file (e.g., augmented HTML file 222), from web content received by the mobile device 300 and uses this extracted contextual menu information to supplement the current menu structure of the browser 320 or the operating system 330 by creating overlay windows. For example, menu overlay controller 313 may be called responsive to browser helper object 321 intercepting an augmented HTML file containing contextual menu information. Then, menu overlay controller 313 may parse out the contextual menu information and insert appropriate contextual menu entries into the browser menu structure via a windows overlay call. In one embodiment, the contextual menu entries are presented by obtaining the menu handle of the current window and updating it with the new data.

Essentially, in various embodiments of the present invention, the client context manager 310 may intercept calls when the browser menu key is pressed and then menu overlay controller 313 may add other contextual menu entries on top of or adjacent to the current standard menu. In alternative embodiments, assuming the availability of an open API within the operating system 330 or the browser 320 relating to menu customization, appropriate calls can be made to such API or call back routines registered with such API.

While in the environment of the present example, contextual database(s) 311, compression/decompression controller 312, menu overlay controller 313 and encryption/decryption controller 314 have been described as residing within or as part of the client context manager 310, in alternative embodiments one or more of these functional units may be implemented within operating system 330, browser 320 or by hardware or firmware (not shown) associated with the mobile device 300.

In one embodiment, the functionality of one or more of the above-referenced functional units may be merged in various combinations. For example, compression/decompression controller 312 may be incorporated within the encryption/decryption controller 314 or vice versa. Moreover, the various functional units can be communicatively coupled using any suitable communication method (e.g., message passing, parameter passing, and/or signals through one or more communication paths, etc.). Additionally, the functional units can be physically connected according to any suitable interconnection architecture (e.g., fully connected, hypercube, etc.).

According to embodiments of the invention, the functional units can be any suitable type of logic (e.g., digital logic, software code and the like) for executing the operations described herein. Any of the functional units used in conjunction with embodiments of the invention can include machine-readable media including instructions for performing operations described herein. Machine-readable media include any mechanism that provides (i.e., stores and/or transmits) information in a form readable by a machine (e.g., a computer). For example, a machine-readable medium includes read only memory (ROM), random access memory (RAM), magnetic disk storage media, optical storage media, flash memory devices, electrical, optical, acoustical or other forms of propagated signals (e.g., carrier waves, infrared signals, digital signals, etc.), etc.

Figure 4:
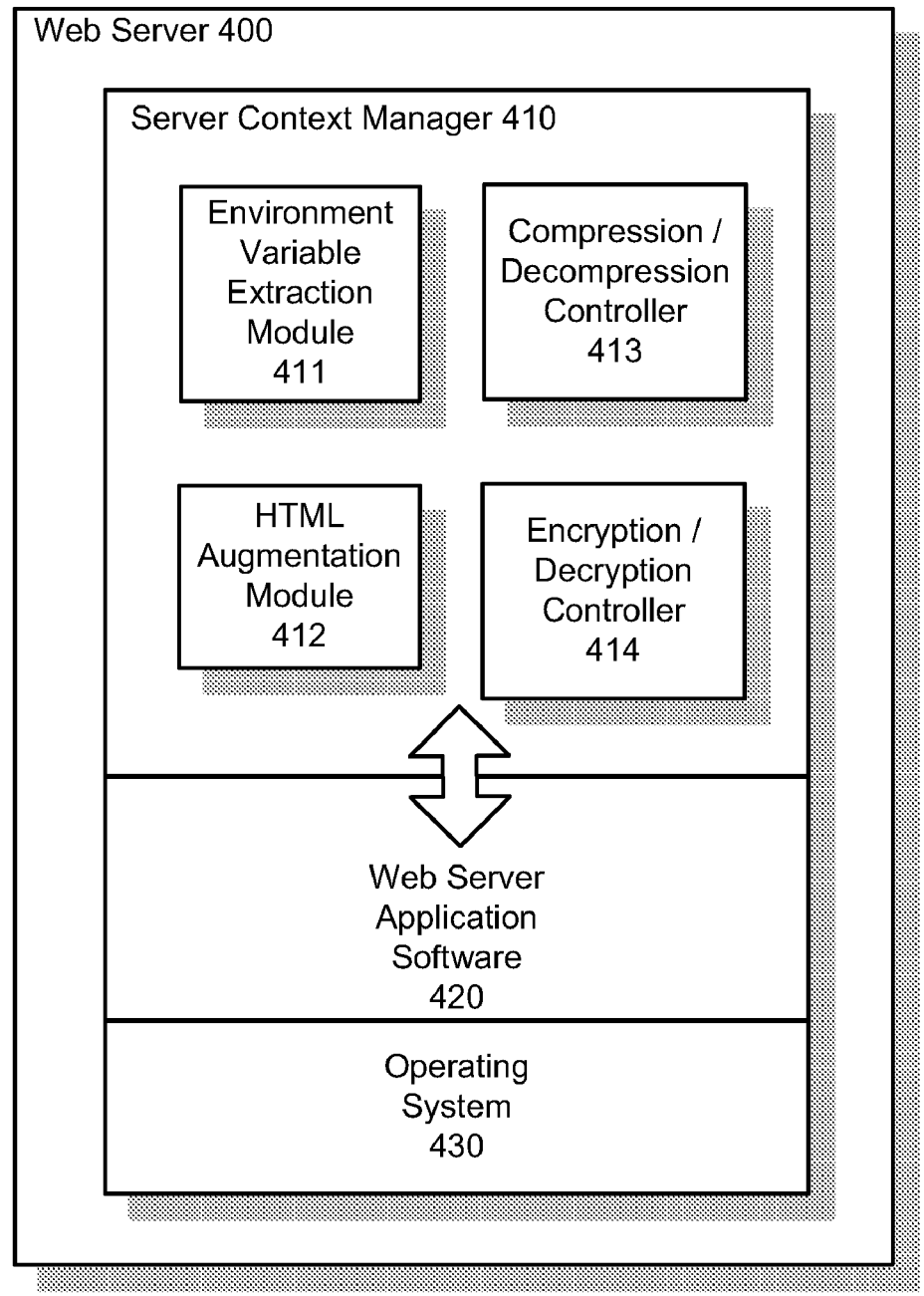
FIG. 4 is a simplified block diagram conceptually illustrating the interactions of various functional units of a web server in accordance with an embodiment of the present invention.

FIG. 4 is a simplified block diagram conceptually illustrating the interactions of various functional units of a web server 400 in accordance with an embodiment of the present invention. In the present example, web server 400 includes a server context manager 410, web server application software 420 and an operating system 430. In one embodiment of the present invention, the server context manager 410 may be implemented as a web server-side plug-in. For example, server context manager 410 may comprise an Internet Server Application Programming Interface (ISAPI) filter. ISAPI filters are DLL files that can be used to modify and enhance the functionality provided by Internet Information Services (IIS), Microsoft's collection of Windows-based web server services. In one embodiment, the server context manager 410 runs on an IIS server, filtering every request flowing through web server 400 until it observers one that it is configured to process.

In general, server context manager 410, may listen to all requests to the site or sites on which it is installed. The ability to examine and modify both incoming and outgoing streams of data makes ISAPI filters powerful and flexible. In embodiments in which server context manager 410 is implemented as an ISAPI filter, it may be registered at either the site level or the global level (global filters apply to all sites on the IIS server), and are initialized when the worker process is started.

As depicted and in accordance with the present example, server context manager 410 includes an environment variable extraction module 411, an HTML augmentation module 412, a compression/decompression controller 413 and an encryption/decryption controller 414.

In one embodiment, compression/decompression controller 413 contains the current compression and decompression libraries which can be augmented by third parties. Depending on whether or not compression/decompression is required these library routines may be called.

Similarly, encryption/decryption controller 414 contains the current encryption and decryption libraries which can be augmented by third parties. Depending on whether or not encryption/decryption is required these library routines may be called.

According to various embodiments of the present invention, contextual data provided by a requesting client device is distributed to information servers (e.g., application servers and/or database servers) fronted by web server 400 in the form of environment variables. In one embodiment, incoming request data from requesting client devices is in the form of augmented HTTP requests, such as augmented HTTP request 221. According to one embodiment, environment variable extraction module 411 is configured to extract one or more of the following environment variables from incoming request data:

```
$name1     = $ENV{ 'HTTP_5O9ON'    };
$company1  = $ENV{ 'HTTP_5O9OC'    };
$address1  = $ENV{ 'HTTP_5O9OA'    };
$phone1    = $ENV{ 'HTTP_5O9OT'    };
$zipcode1  = $ENV{ 'HTTP_5O9OZ'    };
$email1    = $ENV{ 'HTTP_5O9OE'    };
$dui1      = $ENV{ 'HTTP_5O9DUI'   };
$gps       = $ENV{ 'HTTP_5O9GPS'   };
$gpsn      = $ENV{ 'HTTP_5O9GPSN'  };
$gpsw      = $ENV{ 'HTTP_5O9GPSW'  };
$dname1    = $ENV{ 'HTTP_5O9DNAME' };
$dpi1      = $ENV{ 'HTTP_5O9DPI'   };
```

Once the environment variables have been set, the contextual data may be passed back to the appropriate information server, e.g., one of application servers 250 or database server 260, via the common gateway interface (CGI) protocol. Based on the disclosure provided herein, one of ordinary skill in the art will appreciate a variety of ways in which contextual data may be passed to the appropriate information server.

In one embodiment of the present invention, HTML augmentation module 412 incorporates customized content, such as customized content 242, received from information servers, e.g., one of application servers 250 and/or database server 260, responsive to the client request into one or more augmented HTML files. HTML augmentation module 412 may also format the content returned to the requesting client device in accordance with various device and/or terminal characteristics, settings and/or parameters as indicated within the client request.

Figure 5:
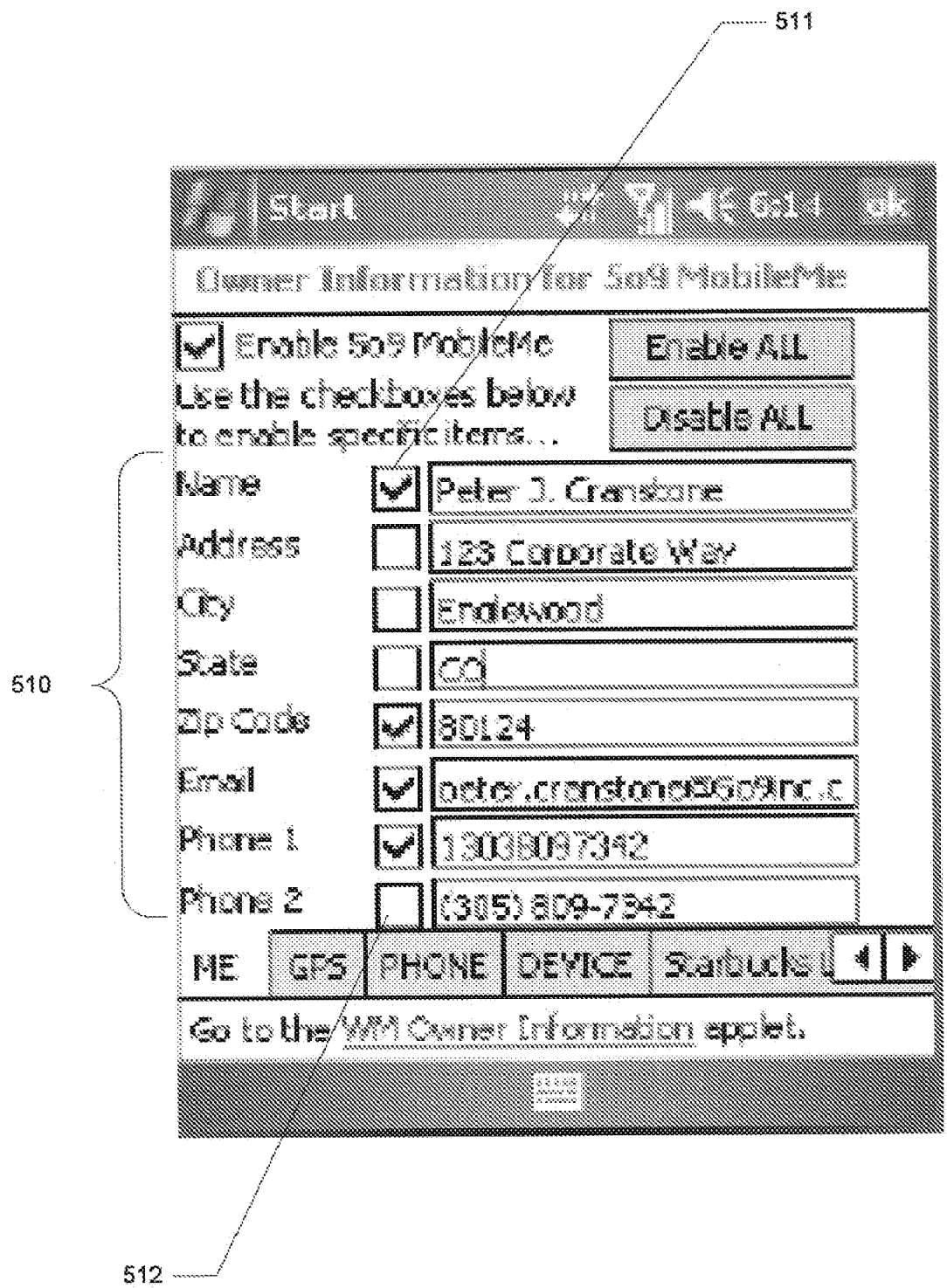
FIG. 5 illustrates an owner information screen, which allows an end user to selectively enable or disable transmission of various fields of personal information in accordance with an embodiment of the present invention.

FIG. 5 illustrates an owner information screen in accordance with an embodiment of the present invention. In the current example, checkboxes are provided to allow an end user to selectively enable or disable transmission of various protected fields of contextual data, such as personal information 510. If a checkbox is checked, such as checkbox 511, the information associated with the corresponding protected field is sent with navigation requests originated by the mobile device. If a checkbox is unchecked, such as checkbox 512, the information associated with the corresponding protected field is not transmitted with navigation requests. In one embodiment, different subsets of protected fields may be enabled or disabled on a domain-by-domain basis, on a site classification basis and the like. End user preferences regarding enabled/disabled protected fields may also be applied in relation to context not associated with the target of the navigation. For example, protected fields may be independently enabled or disabled based on the day of the week, times of day, etc. In this manner, an end user may be provided with full control of the type of information made available to web servers and/or service providers.

Figure 6:
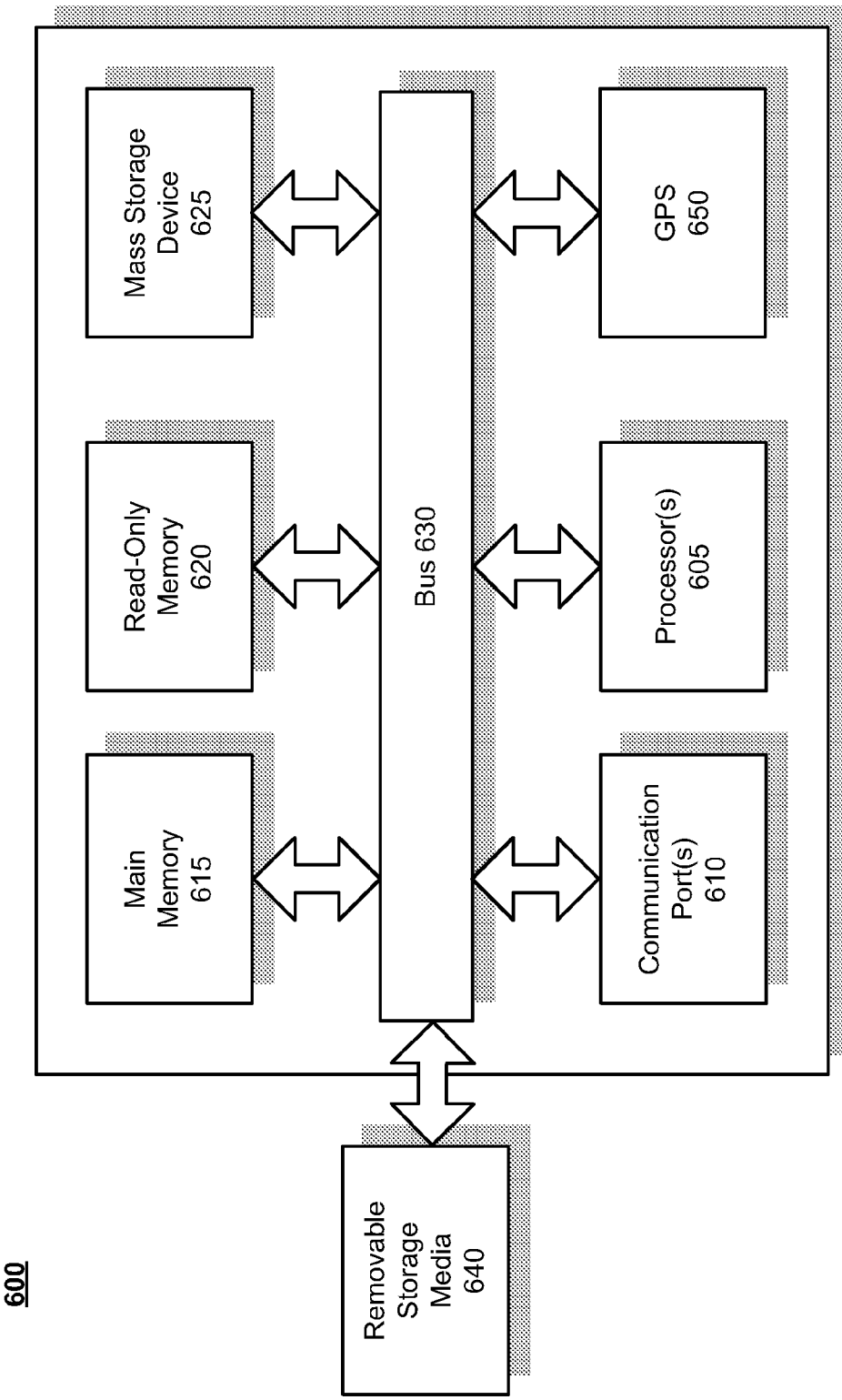
FIG. 6 is an example of a computer system with which embodiments of the present invention may be utilized.

Embodiments of the present invention include various steps, which will be described in more detail below. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 6 is an example of a computer system 600, such as a client device or web server, with which embodiments of the present invention may be utilized.

According to the present example, the computer system includes a bus 630, at least one processor 605, at least one communication port 610, a main memory 615, a removable storage media 640 a read only memory 620, and a mass storage 625.

Processor(s) 605 can be any known processor, such as, but not limited to, mobile application processors or other processors designed for portable devices, such as the ARM Cortex™-A7, -A8 or A9 processor of ARM Holdings, one or more of Texas Instruments' OMAP family of processors (e.g., the OMAP2430 or the OMAPV2230), an Intel® 80386 processor, and Intel PXA901 processor, an Intel Itanium® or Itanium 2 processor(s), or AMD® Opteron® or Athlon MP® processor(s), or Motorola® lines of processors. Notably, future mobile devices are likely to have at least two processors, one for carrier processing and one for application processing.

Among other things, processor(s) 605 is generally responsible for executing various operational instructions maintained in main memory 515, and processing and otherwise interacting with various other input/output (I/O) devices, such as internal and/or external context data sources. In one embodiment of the present invention, processor(s) 605 may receive interrupts on a periodic basis from context data sources (e.g., external context source(s) 370, GPS receiver 360 and/or third-party context source(s) 350). Such interrupts may be received, for example, whenever new data is available from the particular source or on a periodic basis (e.g., every few seconds or so). Such interrupts may be received using any interrupt scheme known in the art including, but not limited to, using a polling scheme where processor(s) 605 periodically reviews an interrupt register, or using an asynchronous interrupt port of processor 605. Alternatively or additionally, the processor(s) 605 may proactively request data from context data sources on a periodic or as needed basis. Based on the disclosure provided herein, one of ordinary skill in the art will recognize a variety of interrupt and/or polling mechanisms that may be used in relation to different embodiments of the present invention.

Communication port(s) 610 represent physical and/or logical ports. For example communication port(s) may be any of an RS-232 port for use with a modem based dialup connection, a 10/100 Ethernet port, or a Gigabit port using copper or fiber. Communication port(s) 610 may be chosen depending on a network such a Local Area Network (LAN), Wide Area Network (WAN), or any network to which the computer system 600 connects.

Communication port(s) 610 may also be the name of the end of a logical connection (e.g., a Transmission Control Protocol (TCP) and/or User Datagram Protocol (UDP) port). For example communication ports may be one of the Well Know Ports, such as TCP port 80 (used for HTTP service), assigned by the Internet Assigned Numbers Authority (IANA) for specific uses.

Main memory 615 can be Random Access Memory (RAM), or any other dynamic storage device(s) commonly known in the art. Read only memory 620 can be any static storage device(s) such as Programmable Read Only Memory (PROM) chips for storing static information such as instructions for processor 605.

Mass storage 625 can be used to store information and instructions. For example, hard disks such as the Adaptec® family of SCSI drives, an optical disc, an array of disks such as RAID, such as the Adaptec family of RAID drives, or any other mass storage devices may be used.

Bus 630 communicatively couples processor(s) 605 with the other memory, storage and communication blocks. Bus 630 can be a PCI/PCI-X or SCSI based system bus depending on the storage devices used.

Optionally, in the case of a server and typically in the case of a fixed client device, such as a desktop computer, operator and administrative interfaces 635, such as a display, keyboard, and a cursor control device, may also be coupled to bus 630 to support direct operator interaction with computer system 600. Other operator and administrative interfaces can be provided through network connections connected through communication ports 610.

Removable storage media 640 can be any kind of external hard-drives, floppy drives, IOMEGA® Zip Drives, Compact Disc-Read Only Memory (CD-ROM), MultiMedia Cards (MMCs), secure digital (SD) cards, such as miniSD and microSD cards, Compact Disc-Re-Writable (CD-RW), Digital Video Disk-Read Only Memory (DVD-ROM).

GPS 650 includes a GPS receiver and provides real-time GPS location data. GPS 650 may be an external or integrated with the client device. GPS 650 may include its own processor and/or memory or utilize the host processor(s).

Depending upon the particular implementation, computer system 600 may also include one or more other integrated or externally connected devices that serve as sources for context data. For example, other sources of context data include, but are not limited to, blue tooth devices, USB devices, flash drives, fingerprint readers or other biometric devices, heart rate monitors and the like.

The components described above are meant to exemplify some types of possibilities. In no way should the aforementioned examples limit the scope of the invention, as they are only exemplary embodiments.

Figure 7:
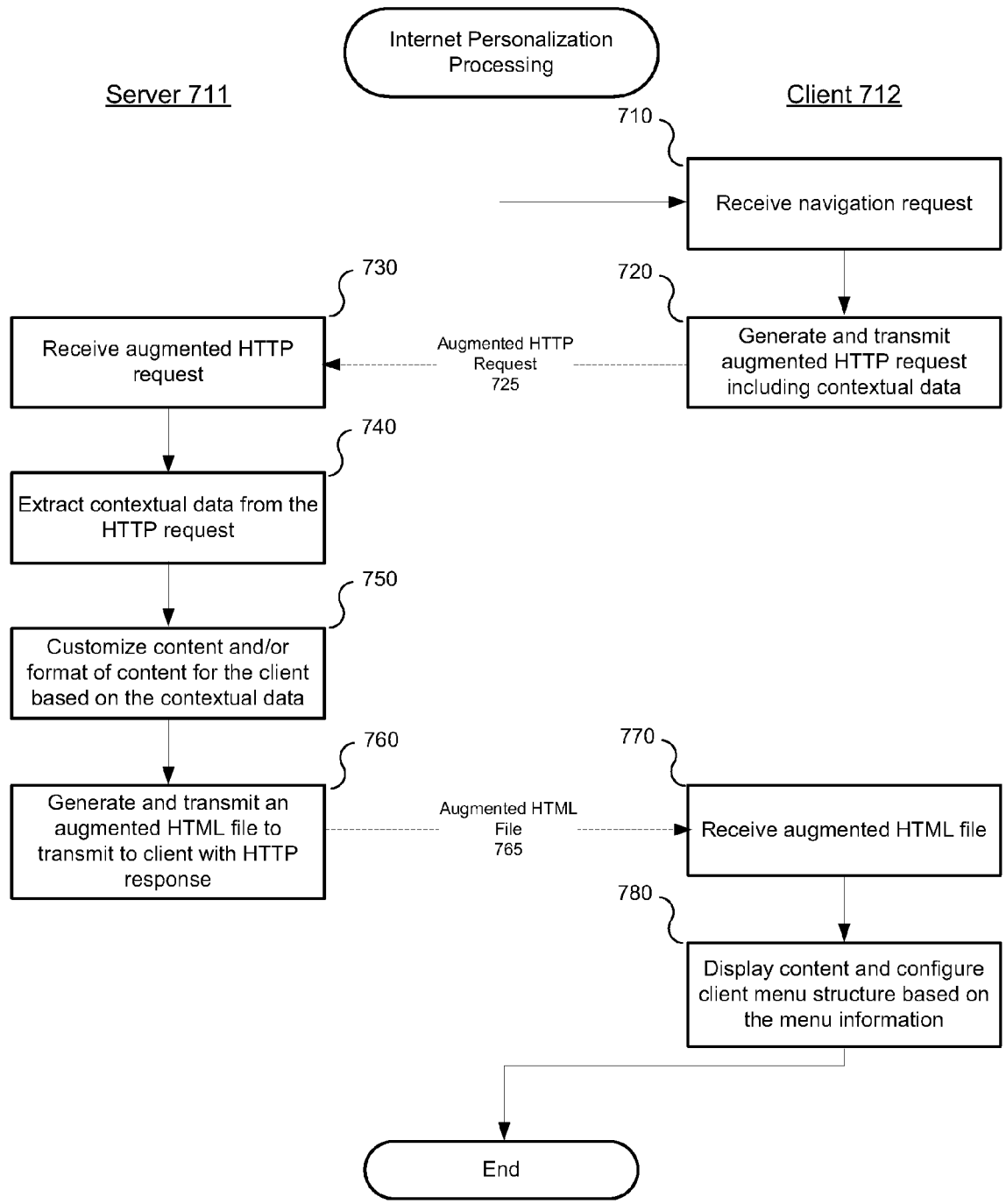
FIG. 7 is a high-level flow diagram illustrating internet personalization processing in accordance with an embodiment of the present invention.

FIG. 7 is a high-level flow diagram illustrating internet personalization processing in accordance with an embodiment of the present invention. Depending upon the particular implementation, the various process and decision blocks described below may be performed by hardware components, embodied in machine-executable instructions, which may be used to cause a general-purpose or special-purpose processor programmed with the instructions to perform the steps, or the steps may be performed by a combination of hardware, software, firmware and/or involvement of human participation/interaction.

At block 710, a navigation request is received at client 712. The navigation request may be as a result of end user interaction with a browser or local application. Alternatively, the navigation request may be generated without end user involvement, such as for example, in the case of automated updates to software and the like.

At block 720, responsive to the navigation request, the client 712 generates and transmits an augmented HTTP request 725 including contextual data. According to one embodiment, augmented HTTP request 725 is a standard or conventional HTTP request, but supplemented to include additional information relating to one or more of location information, device data, terminal capabilities, operating system capabilities, user data and time information. As described in more detail below, according to one embodiment, augmented HTTP request 725 includes one or more customized User_Agent header fields (not shown) for transmitting to a server 711 (i) information regarding who the user is (e.g., names, addresses, phone numbers, gender, personal advertising preferences, social advertising preferences); (iii) what the client device is, what the operating system and/or terminal capabilities are (e.g., screen resolution, color capabilities, accepted compression, etc.); and (iii) information indicating where the client device is, such as real-time GPS location of the client device from which the request originated.

At block 730, server 711 receives augmented HTTP request 725. In one embodiment, augmented HTTP request 725 is first seen by a web server-side plug-in, such as an Internet Server Application Programming Interface (ISAPI) filter. Based on the disclosure provided herein, one of ordinary skill in the art will appreciate a variety of alternative mechanisms by which the augmented HTTP request 725 may be processed.

At block 740, the server 711 extracts contextual data provided by client 712 from augmented HTTP request 725. As indicated above, in one embodiment, the contextual data is transmitted in one or more customized User_Agent header fields of the augmented HTTP request 725.

At block 750, based on the contextual data, an information server, such as one of application servers 250 or database server 260, fronted by server 711 customizes the content and/or format of the content requested by client 712. As indicated above, in one embodiment, one or more environment variables are set and passed to the information server by the CGI protocol. Using whatever information may be of use to the information server, the information server may then tailor the content returned and/or format of the content returned to the client 712.

At block 760, server 711 generates and transmits an augmented HTML file 765 to transmit to client 712 with an HTTP response. According to one embodiment augmented HTML file 765 represents a standard or conventional HTML file, but supplemented to include additional information regarding a menu structure to be presented on the client 712. As described further below, according to one embodiment, custom menu information may be embedded within a comment of a script of the augmented HTML file 765. In another embodiment, the custom menu information may be embedded within a meta tag defined for this purpose and recognized by the client-side functionality. Based on the disclosure provided herein, one of ordinary skill in the art will appreciate a variety of ways in which custom menu information may be embedded within augmented HTML file 765.

In some embodiments, the custom menu information may take into consideration all or part of the contextual data provided by the requesting client device 712. For example, in one embodiment, the context data may indicate the end user is a novice user. Responsive to this indication of the user's skill level, the menu structure provided by the server 711 may exclude advanced features. Similarly, an indication within the context data provided by the client 712 that the user is an expert user of the web service or application being accessed on the server 711 may cause the server 711 to provide the client 712 with a menu structure that includes the advanced features.

At block 770, augmented HTML file 765 is received by client 712. In one embodiment, augmented HTML file 765 is first seen by a browser helper object, such as browser helper object 321.

At block 780, a menu structure of client 712 is configured to respond appropriately to end user interaction based on the contextual menu information provided by the information server and the remaining content supplied in augmented HTML file 765 is rendered on a display of the client device 712. According to one embodiment, the information regarding the menu structure received in augmented HTML file 765 is used to dynamically reconfigure the menu information/structure presented by the operating system and/or an application, such as a mobile browser, running on the client device 712. In one embodiment, the browser helper object, responsive to intercepting augmented HTML file 765, invokes a menu overlay controller 313, which creates overlay windows via appropriate windows overlay calls by obtaining the menu handle of the desired window, e.g., the browser window menu handle, and updating it. On an ongoing basis, the overlay controller 313 may then intercept calls when the browser menu key is pressed and may add other contextual menu entries on top of the current standard menu.

FIG. 8A and FIG. 8B are simplified examples of an augmented HTTP request in accordance with an embodiment of the present invention. In FIG. 8A, a portion of an augmented HTTP request 810 is shown containing various HTTP request header fields, (e.g., User_Agent fields) in which contextual data may be injected for delivery to a server. In this example, the augmented HTTP request 810 is shown with a subset of the User_Agent fields, fields 815, in an encrypted form as it would appear in transit between the originating client and the destination server.

According to the present example, the header of augmented the HTTP request 810 includes an HTTP_ACCEPT_ENCODING User_Agent field 811, which may be used to identify encryption and/or compression used for encrypted fields, such as fields 815. The header of augmented the HTTP request 810 also includes a HTTP_MTHL User_Agent field 812, an HTTP_HTTPM User_Agent field 813 and an HTTP_USER_AGENT User_Agent field 814. The HTTP_MTHL User_Agent field 812 may be used to indicate whether the requesting client supports Multiple Target Hyper Linking; and, if so, which version. The HTTP_HTTPM User_Agent field 813 may be used to indicate whether the requesting client supports the HTTPM protocol. The HTTP_USER_AGENT User_Agent field 814 may be used to identify the client and version to appropriate processing entities on the server.

In FIG. 8B, a header of the augmented HTTP request 820 is shown after being received and decrypted by a server. At this point, the data carried by the previously encrypted fields 825 (in this example, including, client device altitude, client device latitude, client device longitude, an address of the client device's owner, an email address of the client device's owner, a name of the client device's owner and a telephone number of the client device's owner) can be ascertained.

The exemplary contextual data described with reference to FIG. 8A and FIG. 8B is not intended to represent a comprehensive list of data that may be communicated from a client to a server. Rather, for same of brevity, FIG. 8A and FIG. 8B are intended to illustrate in a simplified manner a few examples of contextual data.

As indicated above, various other static and dynamic device capabilities and information (such as, but not limited to screen size and resolution, colors, encryption and compression capabilities battery status, IMEI number, phone number, email address, accelerometer or gyro status, screen orientation, colors, audio and video formats and the like) may be provided as part of the contextual data communicated from a client device to a server.

As described further below with reference to FIGS. 8C-8H, in various embodiments of the present invention, third-party application developers may add customer request headers to any or all navigations being made to the web by implementing an API function that will be called by the client context manager, such as client context manager 310, prior to initiating a navigation request to the web. In this manner, third-party applications may insert whatever information they would like to convey as part of the navigation request.

FIG. 8C is an example of an Add Request Headers API function that can be implemented by a third-party client application according to one embodiment of the present invention. According to the present example, the Me_AddRequestHeaders function has a single input parameter. According to various embodiments of the present invention, a client context manager may call this function just before a browser navigation takes place to give participating third-party applications an opportunity to add customer request headers to select or all navigations being made to the web.

FIG. 8D is an example of an API input parameters structure according to one embodiment of the present invention. In the present example, the ADDREQUESTHEADERS_INPUT_PARAMETERS structure includes version information and input/output parameters. The input parameters include, among other parameters, the fully-qualified URI for the current request, which allows third-party client applications to base their header customization with reference to same.

FIGS. 8E-8H are coding examples for adding custom request headers according to one embodiment of the present invention. The examples include embedded comments and are thus self-explanatory.

FIG. 9A is an example of an augmented HTML file 910 in accordance with an embodiment of the present invention. In the current example, custom menu information 915, such as contextual menu information 243, is embedded within a script comment. Each line of the custom menu information 915 may be either a separator or a menu element. Each menu element includes a display portion 911 and an action portion 912. The display portion 911 is the portion of the menu element that will be presented in a menu structure of a browser or operating system. While in various examples discussed herein, the client device is a pocket PC, the menu structure may be presented in the context of various other client devices, including, but not limited to a desktop computer, a laptop computer, a PDA, a smartphone or other web-enabled device. Further, while in the current example, the display portion 911 is a text string, in other embodiments, the display portion 911 may be a graphic, a logo, a video clip, an audio clip or a multimedia clip. As indicated above, various other mechanisms are available for delivering custom menu information to a client device. For example, the custom menu information may be embedded within a meta tag or other field of an augmented HTML file.

In the present example, the action portion 912 is a text string representing an action to be performed responsive to the corresponding display portion 911 being selected from the resulting customized menu. In one embodiment, action portion 912 may represent be a URL, such as a script that runs on a server. Alternatively, the action portion 912 may represent a command recognized by the operating system or an application of the client device, which when executed initiates activity taking place on the client device, e.g., opening a contact list, dialing a phone number, sending an email or text message, etc.

FIG. 9B illustrates the effect of the augmented HTML file 910 of FIG. 9A on the browser menu structure 951 of a mobile device 950 in accordance with an embodiment of the present invention. According to the present example, after the mobile device 950 receives augmented HTML file 910, subsequent activation of the menu by way of a menu key or the like of mobile device 950 will cause browser menu structure 951 to be displayed until different custom menu information is received.

Use Cases/Examples

As indicated above, as a result of the device-, user- and location-awareness provided to content and service providers by embodiments of the present invention, numerous data usage models, such as local search, local advertising, location-based services, mobile asset and policy management, mobile content, personalized content and the like, become feasible. For purposes of illustrating the versatility of various embodiments of the contextual data communication platform, additional use cases and examples will now be described; however, these specific examples are in no way intended to be limit the present invention as various alternatives, modifications, and equivalents will be apparent to those skilled in the art without varying from the spirit of the invention.

Use Case #1—Contextual Web Services—Gaming: Opportunities in the emerging adult and urban gaming niches along with commercial co-marketing strategies are driving various game distributors and interactive entertainment software companies to examine their interactive software deployment strategies. For example, mobile, which is the newest game delivery extension, has proven to be a support challenge. Currently, users must select their carrier and then determine if their phone even accepts games from the distributor. Even if their mobile device does accept games from the particular distributor, the end-user must still determine which games are supported. As a result, distributors are in need of a common web services based solution that works on all devices, regardless of network.

The contextual data communication platform described herein, can be used to support various online interactive gaming and retail tie-ins. For example, in an exemplary interactive game/merchandising partnership, players may create retail clothing stores and merchandising based upon the demographics of their location, current (or sneak-peak) merchandise and create fantasy stores base upon their style taste, size etc. On their desktop device, players may be able to view 3-D images of their store designs. On their mobile devices, players may be provided the ability to find the nearest particular real world retail clothing stores, receive simulation and real mobile coupon campaigns that they've created online as well as view individual garments. On their mobile devices they can view images and videos of models with their particular body type, clothing size or coloring.

In connection with a golf game, golfers may be provided with the ability to take a professional golfer, such as Tiger Woods or other PGA professionals on the road. For example, from any golf course they may be provided with the ability to "play" against a selected professional golfer—see the selected professional's lie and what shots the selected professional has taken and compare their game to the selected professional golfer. Course location and shots played may be determined by GPS or course installed near field communication (NFC) infrastructure, such as wireless access points. Users can download device appropriate video clips of great golf shots, pictures of amazing golf holes, and inspirational music to help them psych up for the day's competition. Weather conditions and altitude may also influence the game. As a result, shot recommendations and play may be adjusted based upon actual location and local weather reports. Players may also be provided with the ability to build profiles based on height, weight and handicap. Access to different branded golf clubs and branded golf balls may also allow the player to see the effects gear changes may have on a particular shot and given their personal profile. Meanwhile, using dynamic contextual menu information pushed to the player's mobile device, product information and the closet retail outlet for those clubs and balls are just a menu selection away.

Personalization is a hallmark of simulation games, but privacy can be a concern. Adults (and concerned parents) can therefore build customization into their gaming by making personal information available only during that gaming session. Real-time location data supports accurate simulations/comparisons, as well as contextually relevant tie-ins to consumer goods and retail outlets. This keeps game costs down for consumers and tolerable, if not actually relevant for gamers. Making the appropriate options available for each device (3-D on the desktop, low-res video clips or 1-D barcodes on mobile) ensures that usability is always optimized for whatever device the game is using.

In such a scenario, benefits to game distributors and interactive entertainment software companies include increased penetration into an under-served, profitable market, possibly expanded "embedded" advertising revenue and closed loop marketing opportunities with promotional partners. Some game distributors and interactive entertainment software companies may even use such opportunities as a chance to test a new delivery model in advance of smartphone adoption by their primary customer base. According to various embodiments of the contextual data communication platform, game distributors and interactive entertainment software companies may realize CAPEX/OPEX efficiencies, realize faster time to market for mobile games as a result of one infrastructure supporting both mobile and desktop games, regardless of public, private or carrier network.

Use Case #2—Contextual Web Services—customer relationship management (CRM): According to various embodiments, the contextual data communication platform is designed with both businesses and their employees and customers in mind. The software balances the need for privacy and control with the need for commerce and convenience. Nowhere are control and convenience more in conflict than within the Sales organization. Sales force automation (SFA) and CRM applications offer the promise of world class customer care and sales productivity. Unfortunately, that promise is seldom realized as it requires complete access to customer, inventory, territory and marketing information. Keeping customer and territory information up to date requires a data entry discipline that is seldom the strong suit of the average salesperson. Next, finding a way to conveniently access and view this information while on the road is often challenging.

SFA applications are designed to deliver the necessary information—if they get the required input. The application is simply missing the context of the each specific user and situation. With it, data entry is minimized, making it more likely, and data can be formatted properly for a laptop, PDA or smartphone. Context manager and data applications implemented for the contextual data communication platform can reduce sales data entry and boost productivity and usage by allowing automatic population of user, and account management data based upon physical location and sales representative profile.

As part of the CRM infrastructure, an organization that adds the following contextual data to its customer, employee, inventory/billing and product information databases can see significant CRM compliance and productivity gains:

GPS coordinates to its customer database
Price negotiation limits/override permissions to each salesperson
Export restrictions to inventory items
Assigned device IDs to each salesperson
Data access policies based up person and geographic region Armed with a GPS-enabled device a salesperson traveling to China, for example, may meet with a customer. A GPS read may be required before accessing certain data and the sales person is notified. The salesperson may then access the SFA system via the web for live customer history, inventory availability and pricing information. The salesperson may be automatically logged in to both their and their customer's account information. Only the inventory that meets U.S. export laws to China is shown as available and the amounts are displayed properly for the device. The purchase price may then be negotiated and agreed upon without delay. The customer requests a product schematic, but the request is denied because technical drawings cannot be downloaded when visiting mainland China, due to company IP policies. The entire transaction history may be captured and exported to the sales reporting system. The only data entry required is for the amount of each item and personal notes that the salesperson wishes to include.

Use Case #3—Contextual Web Services—Retail Merchandising: Food and beverage companies, may uses contract merchandisers and mystery shoppers to keep inventory and point of purchase displays up to date and aligned with promotions in retail stores. At times, the companies receive conflicting reports regarding merchandising compliance from their merchandisers and store personnel and have no good means of communicating last minute adjustments to a specific retail outlet's merchandising plan or verifying merchandising compliance in real-time.

Using various embodiments of the contextual data communication platform, merchandising staff may be supplied with mobile devices having both camera and GPS functionality. GPS functionality may be enabled upon reaching the assigned retail store. Based upon the location and store (which may be determined by GPS/address mapping) a menu of merchandising tasks may be provided in the browser menu (responsive to dynamic contextual menu information received at the mobile device) when the merchandiser logs on. The task list may be modified based upon current, expired and planned promotions, regional or market differences, individual store demographics, and/or available inventory. Inventory counts may be entered manually or scanned from devices with built-in scanning capabilities. When the tasks are completed, a photograph of merchandising displays may be taken, with GPS, time and retail outlook-specific data may be embedded and automatically uploaded as part of the report. A complete audit cycle may therefore be built into the standard field automation web service.

In such a scenario, benefits to food and beverage companies include merchandising instructions and compliance reporting being made available by the ability to access real-time location, time, inventory and promotional data—some of which comes from the device and others of which come from disparate databases from multiple sources (e.g., the food and beverage company, an advertising agency, a retail store, a merchandising organization). Embedded image data provides a means for accurate, visual compliance verification with no typing or manual file transfers. Typing is minimal, instructions are relevant to the specific situation, and ambiguity is low. Further benefits may include, improved field productivity, improved field accuracy, real-time compliance audits, immediate notification of onsite issues in conflict with planned promotions, CAPEX/OPEX efficiencies, improved demand chain communications, reduced audit costs, payment only for confirmed merchandising services and the like.

Use Case #4—Contextual Web Services—News and Information—Business-to-Business (B2B): Without the benefit of embodiments of the present invention, an online business news and information site may exist that includes one or more blogs, demos, mobile news, product reviews and customer feedback options. The site may have ties to one or more analyst groups that provide a set of services the web site/service provider believes will be relevant to their users. The site may or may not be supported by advertising. On mobile, the online business news and information site customers cannot easily navigate through all the links, view images or have the necessary memory to download podcasts or conference videos.

In an embodiment in which the online business news and information site is configured in accordance with an embodiment of the present invention, mobile visitors to web site may be given browser menu options versus pages. The options may include subscribing or unsubscribing to a blog, presenting only those demos that are compatible with the user's mobile device and then quickly and easily rating them for other users' benefit. The site may link to a partnering mobile analyst where podcasts can be downloaded or viewed based on device capabilities and reports can be listed and purchased, assuming the analyst can verify user ID and generate a corporate invoice. And users can read product reviews that are instantly prioritized based upon the device they have. If the web site is advertising driven, advertisers can "buy" menu placement spots (delivered to the mobile device in the form of dynamic contextual menu information, for example) that navigate to their offer or sponsor or the advertisers may graphically sponsor a service, such as a podcast or review.

In such a scenario, benefits to the users of the online business news and information site include easy-to-use, menu driven services and information navigation. For example, device contextual data drives the priority of services and products that are offered to the mobile user. Such customization can also increase customer satisfaction, as the chance of a positive download experience increases when only device compatible options are presented. Device information, combined with subscriber profile information may also the mobile web service to personalize the services and information menu, and ensure that advertising is relevant to that specific user.

Benefits to the web service include the extension of web services to mobile users, ease-of-use for their mobile customers, increased relevance for their mobile customers, the extension of the advertising revenue model to the mobile platform, the creation of marketing partnership/lead generation/revenue share opportunities, CAPEX/OPEX efficiencies, the ability to rapidly develop new services, menu navigation may be quickly and easily modified based upon user feedback and device appropriate options may reduce customer support calls on regarding downloads.

Use Case #5—Contextual Web Services—Web Developer: A web marketing communications company is looking to differentiate itself from other full-service marketing communications agencies focused on the high-tech market and increase its longevity with existing accounts to help buffer the unpredictability associated with tech startup clients. While tech industry expertise, relationship building and process are true differentiators, to attract its ideal customers, the company needs to strengthen its value proposition without straying from the core competencies that have it made it successful, to date.

Using various embodiments and features of the contextual data communication platform described herein, the company may be provided with a unique opportunity to leverage its strengths to get new business:

Technical Excellence: Mobile and contextual web services are among the most important new technologies of this decade, with billions of dollars being spent to pinpoint target consumers, support mobile workforces and leverage the power of the mobile phone.

Relationship Building: Mobile and contextual web services make it personal. The company can deliver a constant reminder of how this latest technology can be applied to making communications more personal for each customer's business.

Process: Mobile and contextual web services put account management, quality, and results-driven methodology right up front with clients, reminding them of the company's unique value—everyday.

Customers and colleagues may also be provided with click-to-call access to company account managers. Company may provide access or email/text message alerts of new leads, access to documents for review and approval, and helpful hints, press coverage as it becomes available. All of this can be provided directly to a smartphone or PDA. As a result of using embodiments of the contextual data communication platform, information and services that already exist may now be feasibly delivered and used via mobile and automatically routed to the appropriate users.

Use Case #6—Contextual Web Services—Mobile Electronic Commerce (E-Commerce): For purposes of this illustration, it is assumed that a payment processing service, such as Amazon Flexible Payment Service (FPS), Google Checkout or PayPal, wants to extend its services to facilitate mobile e-commerce. The payment processing service also wants to ensure that branding opportunities for mobile payment processing exist, as the brand communicates trust, confidence, security and quality to the consumer, and is part of the value proposition to their vendor customers who pay for the billing service. Their goal is to support both content providers who require micropayment capabilities as well as traditional product and service vendors who outsource their payment processing for e-commerce transactions. Consolidating payment processing with a single provider for mobile and desktop transactions simplifies the business processes for both the vendors and their customers.

To illustrate an exemplary contextual web services solution, using an embodiment of the contextual data communication platform described herein, consider the following: Jim's friend emails him the link for the Voice Over Internet Protocol (VOIP) phone he's been looking for. Jim sees the email on his smartphone while waiting for his flight and clicks through. He enters his order quantity and selects checkout. The payment processing service icon appears in the top browser bar, letting Jim know that his purchase will be hassle-free and secure. Since he has several shipping addresses in his profile, he simply selects the UK office and overnight delivery and hits pay. His phone will be waiting for him in the UK office day after tomorrow. Just before returning home, he downloads several songs direct from a local musician's web site that uses the payment processing service. The local artist provides the option to receive concert and CD updates. With a simple "yes" selection, Jim's email address automatically populates the musician's email subscription list. On the flight home he sees a Sky Mall special for a plasma TV that expires at midnight. He rips out the page and when he lands, goes to their web site and enters the SKU and promo code. To protect payment processing service, its merchants and consumers from fraud, this level of purchase (over $500) requires multi-tier authentication in the form of a login, password and fingerprint or voice authentication. Jim is already logged in, which satisfies the first two criteria. Since his current phone does not have a fingerprint reader on it, he is prompted to speak his pass phrase. The credentials are verified and the TV purchase approved. Jim receives his monthly consolidated payment processing service statement, as does the VOIP phone merchant, Sky Mall and the local musician.

In view of the foregoing scenario, it should be appreciated that using various embodiments of the present invention allows payment processing organizations to now compete with the carriers, offering cost-effective, secure billing services to a significantly broader group of online merchants. By adding contextual web services to the mobile commerce (m-commerce) ecosystem, these organizations can help their retail and content provider customers overcome the remaining consumer barriers to m-commerce adoption, such as reducing mobile data entry hassles, improving storefront and checkout navigation, addressing data privacy management concerns and improving transactional security with bi-directional, multi-factor authentication.

Benefits to payment processors include, improved value proposition to retail and content provider customers, highly personalized service and consumer satisfaction levels, single source of payment processing for e- and m-commerce transactions, browser-based branding on all mobile transactions, device-resident branding that supports shopping and account management behaviors, CAPEX/OPEX efficiencies, one web service works for desktop and mobile customers, all service functionality is field updatable, ability to integrate with self-service account management or campaign management systems via a web services infrastructure and works with existing web and web services infrastructure, including Secure Sockets Layer (SSL).

Use Case #7—Contextual Web Services—Fashion Mobizine: For purposes of this illustration, it is assumed that an online fashion magazine, XYZ Fashion, is launching a new online publication that features music, videos, images and stories supporting fashion trends, news and events. The website is targeted to the sophisticated, female fashion consumer, filling an important gap in women's oriented web content. Content will be highly engaging and interactive—a collaboration of top fashion, music and celebrity icons. Advertising will be used to support the venture and the basic web design is being built for an upcoming fundraising launch. The company is considering use of a matrix code (or two-dimensional bar code), such as Quick Response (QR) codes, as a shortcut for mobile users to reaching the site for the first time. An alternative approach is to use a shorter URL, such as www.xyzfash.tv (.com/.net). Since this will become a destination website, visitors/subscribers will likely bookmark the site for future visits.

To illustrate an exemplary contextual web services solution, using an embodiment of the contextual data communication platform described herein, consider the following scenario: Upon visiting the XYZ web site for the first time, visitors may be encouraged to download a mobile browser plug-in that will reduce data entry, allow for the receipt of personalized content, and enable services such as Fashion-Find to quickly find a local retail outlet for an item featured in web site content or ads. In addition to enabling contextual advertising and knowing in which format to send the content, having access to contextual data enables additional services, such as events reminder (make-over days, fashion shows), which when tied to local ads and coupons can close the marketing loop and provide advertisers with direct return on investment (ROI) on XYZ Fashion advertising investment. Other services may include consumer rating of products or services (true fit, half-size too small, too narrow, beautiful, but get a cami if you're modest) and special "fit features," such as ideal clothing for apples, pears or hourglass figures or best hair styles for oval faces, round faces or high foreheads. Videos, images, ads, designers, articles and reviews can all be prioritized to match each user's profile (tailored, conservative, avant-garde), favorite designers (Chanel, Vera Wang) or age/gender—whatever context the company or consumer desires. Consumers may want to see everything, but appreciate the recommendations that are most flattering or comfortable. On mobile, since so little data can be presented on the screen at once, being able to prioritize and send the most pertinent content first improves customer satisfaction.

In view of the foregoing, it should be appreciated that using various embodiments of the present invention all of these selections may be based upon the ability to offer site appropriate menu selections and deliver to a mobile device, with minimal typing, the content that best represents XYZ Fashion's "high-end" brand and meets the customers' needs. The ability to improve service levels for mobile users may be enhanced using the web browser as a common interface, since nothing new must be learned. XYZ Fashions services can be instantly extended by providing additional services simply by linking and passing along this data to a mapping site, an advertiser's site or an artist's or designer's site—minimal work for XYZ Fashion, maximum value for its readers.

Use Case #8—Contextual Web Services—Electronic Concierge (eConcierge) Services: For purposes of this illustration, it is assumed a hotel chain has partnered with an eConcierge service to allow guests to plan their ultimate customized itinerary and preferences. Everything from favorite coffee, typical wake-up and check-out times, amenities used, such as golf, gym or spa facilities, and favorite room gifts—wine and cheese or fruit and water. Creating such a personalized profile can dramatically improve service levels and guest loyalty to the hotel chain. For frequent travelers, it is important to extend this level of communication and customization to mobile customers, who often receive confirmation and preference questions while on the road with their mobile devices. Being able to extend the eConcierge services to mobile customers simply, quickly and cost-effectively will allow the eConcierge service company to dominate the personalized travel and hospitality services space.

To illustrate an exemplary contextual web services solution, using an embodiment of the contextual data communication platform described herein, consider the following: Ralph booked a last minute trip to Kansas City with a stay at the hotel chain. Along with his email confirmation, he received a link to a series of personal preference questions. He confirmed his reservation was accurate and saved the email to review once he was on the road. From his smartphone he went back to the link and was able to navigate the options via his browser. With his thumb he quickly selected his favorite coffee and a foam pillow to be waiting for him in his room. He was also able to pre-register for wireless web access and set his code and billing preferences and arrange for an extra gym towel and 3 bottles of spring water. Ralph and his family were planning a 10-day trip to Hawaii next month, so he also received an option to access that itinerary, which provided him with a list of options for tee times, and then returned recommended walk-up call times to make the early tee times. He also received recommendations regarding spa treatments for his wife and activities for the kids. Ralph was also provided a selection of island activities and arranged for mask, fins and snorkels to be waiting in the room, along with suggested snorkeling beaches for his children's age. Ralph selected two that looked interesting and received maps and detailed driving and walking directions from the hotel. The remaining activities they planned each evening as the children finished their daily splash down water slide, while Ralph and his wife enjoyed pool-side drinks, ordered from their GPS-enabled mobile phone, from the location-aware bar service, which automatically charged the drinks to their room.

In view of the foregoing, it should be appreciated that using various embodiments of the present invention all of these selections may be based upon the ability to offer site appropriate menu selections and deliver, with minimal typing, the content that best addresses the guests' travel requirements or interests. While full descriptions and colorful photographs are ideal for the family gathered around the PC, only the selection criteria are needed for mobile users. The same back-end powers both, providing a seamless, but device-appropriate experience for the traveler on the run, resort guest, or the home-based travel planner.

Use Case #9—Contextual Web Services—Mobile Social Networking: For purposes of this illustration, it is assumed that an early stage social networking service, MobSN, that allows users to share and congregate around online "hot spots" just as they might in physical world hot spots, such as clubs, restaurants, or the mall, wants to re-create the environmental influences of the physical world within an online community. Knowing where friends or influential people "visit" or "hang out" can help others to learn, enjoy and find camaraderie. While the company is still determining its final business model, tracking online behavior and either serving contextual ads or marketing the data to contextual advertisers, is one possible revenue solution. Since MobSN is re-creating a physical social phenomenon in cyberspace, it was never intended to augment the physical activity; however, using various embodiments of the present invention, "taking the roofs off a restaurant and peering inside to see who is gathered there" is very possible.

Using various embodiments of the contextual data communication platform, mobile MobSN may help users locate their friends and hot hang-outs. With the advent of GPS-enabled mobile devices, MobSN users can make their social plans by checking to see where their MobSN friends are hanging out. Searches or "finds" can be done on friends, or a defined geo-radius (3 miles from home), or venue type within a geographic radius or community (bar, restaurant, club, movie theaters, bowling alleys, soccer fields, parks, etc.). Just like with "cyber" MobSN, "physical" MobSN users can enable/disable location sharing with a single click. Mobile MobSN can be customized to support physical social communities such as resorts, theme parks, ski areas or beach clubs where groups of people are likely to get separated from their parties, or singles are looking for ideas of what to do. It is also ideal for social networking within college campuses.

The mobile interface is not large enough to accommodate the existing desktop controls so menu options to find and search are available via the browser and general or community MobSN maps may be made available as web pages to display the location of MobSN network members on the entire browser screen. Walking or driving directions may also be easily derived from this data as an added service. Local ads, coupons or time sensitive offers may also be delivered on screen or in the menus, encouraging physical world meetings. Once found, menus could offer MobSN users click-to-call or click-to-text features, instantly putting members in touch with each other to confirm a meeting. And, for added privacy protection, users (or the system) may challenge an invitation or meeting request by asking for some agreed upon phrase, biometric confirmation or alphanumeric code.

In view of the foregoing and in the context of the present example, it should be appreciated that using various embodiments of the present invention all of these selections may be based upon the ability to offer site appropriate contextual menu selections and deliver, with minimal typing, the content that best addresses MobSN member social networking needs. It provides MobSN with the cyber equivalent of their service for mobile Web users traveling in the physical world.

Use Case #10—Contextual Web Services—Search Portals: For purposes of this illustration, it is assumed that a search portal is trying to extend its web services to mobile users. The company has already created rich search options that are delivered via the browser to desktop users. Unfortunately, it has proven more difficult than anticipated to deliver services to every mobile user regardless of device or carrier. And, on mobile, the screen size simply does not allow for the richness of the desktop applications to shine through. Other search companies/portals are creating separate applications with separate interfaces for each desired service, such as search and mapping. This is slow and expensive, requiring development, distribution and maintenance of every new application on every mobile device to deliver the same broad based web service coverage they enjoy on the desktop. Customers are used to searching, shopping and mapping via the browser.

To illustrate an exemplary contextual web services solution, using an embodiment of the contextual data communication platform described herein, consider the following scenario: Sarah teaches architecture at NYU. She loves everything Italian—music, coffee, cycling, wine and gelato and is currently looking for a Tuscan style house. She's taking a new way home from school today and searches for coffee. She gets the coffee houses listed in order of proximity to her current location, with Amante (they offer gelato) at the top of the list. The search is sponsored by a real estate agent specializing in European design home sales within the burrough she is walking through. She clicks to call the agent and sets up a meeting at the coffee house for tomorrow at 2:00. She gets turn-by-turn directions, and walks the route to make sure the place is not a dive. The agent confirms via a text message. She loves the building and snaps a shot with phone camera, embedding the GPS coordinates. She uploads her photo and automatically overlays it onto a city Map, where she creates both a photographic travel journal and customized architectural walking tour to more actively engage her students. These are saved and stored to her blog, in English and Italian, so she can edit them and print them once she gets to work. She is planning an Italian cycling trip next month, and uses the search portal's ad-sponsored converter to see how far her dollars will go in Euros and converts kilometers to miles to determine the distance of her upcoming ride. On the first conversion, she learns of a new opera and the second provides a 20% off coupon for cycling shorts.

In view of the foregoing, it should be appreciated that benefits of various embodiments of the present invention in the context of the present example include the delivery of location data to the search engine to minimize data entry and return local and contextually relevant search results, advertising is both local and relevant, even to temporary behavior, such as "house hunting," location data paired with photo blogging and mapping services creates a powerful educational and social networking tool. Meanwhile, as above, all of these selections may be based upon the ability to offer site appropriate menu selections and services accessed via a mobile browser to ensure easy navigation that is user customized.

Use Case #11—Contextual Web Services—Mobile Archiving: For purposes of this illustration, it is assumed that a wireless carrier is trying to extend its Wireless Access Protocol (WAP) services to the mobile web and extend its reach into enterprise. This will drive net new customers and increase the average revenue per user (ARPU) of existing customers as they buy more powerful phones and utilize data services on a more regular basis. On mobile, archiving is primarily about saving photos, music and videos. Very few text files are "created" on a mobile device, therefore archiving services that support existing user behaviors are more likely to be adopted than trying to establish new behaviors. At the same time, enterprises are trying to extend existing process and applications to mobile users. Both customer sets need to speed time to market and keep expenses in check. As a result, leveraging existing infrastructure, relationships and resources to achieve their goals is helpful.

To illustrate an exemplary contextual web services solution, using an embodiment of the contextual data communication platform described herein, consider the following scenario: Bill is a house inspector. Sarah is a real estate appraiser. Robert is traffic accident investigator. Barbara is an insurance investigator and Walter is an attorney. All of these professionals spend time both in the field and in the office and they all collect data in the field. Today it is primarily photographs, but it could also include other sensory input such as mold spore counts, air particulate levels or decibel readings. Data may also include field interviews consisting of voice and or video recordings. In many cases, this data must follow a specific chain of evidence, requiring that the originator of the data be identified, the information be time-stamped, that the date be delivered into an approved storage vault within a specified period of time of origination. It may also require a location and collection device identifier. This data may then be used in raw form or merged with other data once our professionals return to their offices. On the consumer side of things, photo blogging, travel journals and online photo and video albums are a few of the most popular archival-based services that can benefit from mobile uploads that are time, geo-tagged and subject to sharing with others. It ensures the users don't forget critical information between when they are out and about and when they get home to organize or edit their data from a desktop computer. Additional variations on these themes are Christmas, Birthday and home décor wish lists and home inventory (sponsored by an insurance firm, for example).

In view of the foregoing, it should be appreciated that benefits of various embodiments of the present invention in the context of the present example include higher customer satisfaction, increased loyalty and ARPU, opportunity for new fee-based services and ad partnerships, the ability to brand within the HTTP browser, the opportunity for expanded use models of existing archival systems, stronger value proposition with leveraged used for fixed and mobile users, CAPEX/OPEX efficiencies, faster time to market for mobile services, mobile services use the same infrastructure as desktop services and mobile application development is not required.

Furthermore, the hardware as a service (HaaS) model is growing at a rapid pace. Each service provider must determine the mobile storage use models that best meet their customers' needs. What differentiates one service provider from another offering the same service is the user interface and flexibility. With the contextual data support, as described above, users are able to type less, but have access to much richer data on which to sort and organize their content for later use. It can also simplify data input, tracking and management processes and offer extended security options as mobile devices become more advanced and include bar code scanners and biometric features.

Use Case #12—Contextual Web Services—Mobile Entertainment MVNO: For purposes of this illustration, it is assumed that an entertainment network, ABC Entertainment Network, delivers digitally protected video to the worldwide mobile community. Subscribers to ABC's exclusive Mobile Entertainment Network can view full-length movies, TV shows, music videos, newscasts, weather forecasts, sporting events, animation, cartoons, comics and much, much more—anytime, anywhere. It appears that ABC works in partnership with the carriers, but functions as an entertainment content Mobile Virtual Network Operators (MVNO) supported by advertising revenue. The current services are offered via feature phones equipped with WAP 2.0 browsers and are targeted strictly to consumers.

Leveraging embodiments of the contextual data communication platform described herein, ABC can extend its services and advertising revenue beyond the feature phone user and into the professional consumer (Prosumer) market. On smartphones, regardless of carrier or network, the user bypasses typing any text codes. They simply select "more" info or "call me" from the ABC-branded browser and not only is their telephone information transmitted to ABC and its advertising partners, but users can send along other data, such as age, personal interests, favorite team, email address and location without the need to manually login or type anything. Ads become more personalized (and have a higher value) and services such as weather, sports scores and preferred media selections can be automatically sent or prioritized for selection via personalized menus. Also, device capabilities, such as screen size and resolution are automatically transmitted to ABC, so the optimal media format may be presented to customers. Users type less data and get exactly what they want and advertisers get pinpoint targeting data. All this can be done without dependence on the carrier. Additionally, by targeting smartphone and PDA users, ABC can expand its media relationships and deliver business focused content and e-zines sponsored by B2B advertisers interested in mobile professionals, such as CRM companies, courier services, airlines, hotels, carriers, etc.

By adding HTTP browser supported services, ABC can reach a broader audience by expanding its services to smartphones. Those services can be available to existing smartphone customers and may also be integrated into new phones distributed by ABC. Because the HTTP browser is used, for smartphone delivered services, ABC can boost its profits, as carrier assistance to identify phone number and customer name is not required. On-screen branding is available in the browser tool bar and menus, ensuring the ABC brand stays in front of their customers whenever utilizing the browser or using an ABC service; and training is minimal Use Case #13—Contextual Web Services—Law Enforcement: For purposes of this illustration, it is assumed that a local police department is looking for a cost effective way to support all mobile officers, whether they be on foot, bicycle, motorcycle, patrol car or accident/mobile command center vehicle. A web service approach appears to be the way to go, as it can be delivered regardless of device type or connection method. Currently the city is using PDAs, laptops, and specialized in-vehicle ultra mobile PCs (UMPCs) for data transmissions. Voice is primarily handled via radio for dispatch and field officer calls and cell phone for general business and investigative calls.

Using various embodiments of the contextual data communication platform, officers can now log into all of their devices using biometrics and the system recognizes who they are and knows what cases or calls they've been assigned. All devices are equipped with GPS for both safety and evidence handling purposes and for some officers, scanners have been included to read vehicle identification numbers (VINs) or other barcoded identification materials. For those investigators assigned to a traffic accident or crime scene, they may be presented a list of tasks required for that call, which could include photographing or videoing the scene, geotagging the image(s) with the detective's name, time and location, and even a "check list" of required questions or evidence collection recommendations to ensure nothing critical is overlooked. Additional notes may be added and embedded with the files. For patrol officers making a traffic stop, they can check VIN, registration, license plate and driver's license info from their handheld device, scanning or typing in just the required data. First responders can rapidly request Fire, EMT or ambulance services with location, directions and officer data automatically attached. Routine traffic stops can be recorded from both in the vehicle and from mobile devices. Department policy controls regarding evidence handling may be enforced, for example, allowing for an officer to initiate an in-vehicle recording from their mobile device, but not to allow the recording to be stopped until they leave the scene.

In view of the foregoing and in the context of the present example, it should be appreciated that using various embodiments of the present invention provide one or more of the following benefits: automatically knowing where each on duty officer is and what their status is facilitates dispatching and case assignments, embedding time, date, crime/accident scene notes and officer data into photographs and video provides consistent evidence documentation, having one-button access to emergency assistance that can communicate officer and location data can save time, lives and property, and in situations where voice communications are impossible or unwise, critical information or requests for assistance can be easily delivered. Meanwhile, having a common interface regardless of vehicle or device ensures that once an officer is trained, they can immediately and effectively work with any assigned vehicle or device.

Use Case #14—Contextual Web Services—Homeland Security: Homeland Security is looking for a cost effective way to support emergency first responders and to ensure that regardless of agency, all first responders have access to the same information and resources. A web service approach appears to be the way to go, as it can be delivered regardless of device type or connection method. Currently emergency first responders are using a combination of Smartphones, PDAs, laptops, ruggedized mobile devices, and specialized in-vehicle UMPCs for data transmissions. Voice is primarily handled via radio (many with Internet connectivity) and cell phone.

Using various embodiments of the contextual data communication platform, when first responders log in, the emergency management system recognizes who they are and knows what security access and/or subject matter is available to them. Devices may be equipped with GPS for both safety and data gathering purposes. For those responders assigned to search and rescue they can be presented a list of residents, or high-risk sites, such as hospitals, schools, day care centers or senior homes. This way, no one is forgotten during the early hours of confusion. Additional scene management and data/evidence gathering task lists can be presented, which could include environmental data gathering, photographing or videoing the scene, geotagging the image(s) or data with the first responder's name, time and location and any other notes deemed important. A "check list" of safety or first aid procedures can also be presented. First responders can rapidly request Fire, EMT or Hazmat with location and directions automatically attached. Environmental data can be transmitted through their mobile device via Bluetooth or USB and immediately uploaded to an agency server and instructions returned to the first responder to clear the area, seek medical attention, or how to properly collect and mark samples. All data may be consolidated and mashed up with maps to give off-site agency personnel a real-time view of how resources are deployed, regardless of agency affiliation. And, data may be directed to one or more agencies based upon the first responders credentials (local fire and Homeland Security or CDC, National Guard and Homeland Security).

In view of the foregoing and in the context of the present example, it should be appreciated that using various embodiments of the present invention provide one or more of the following benefits: automatically knowing where each first responder is and what they are doing facilitates coordination across multiple local, state and national agencies, as well as volunteer organizations, embedding time, date, and responder notes into photographs and video provides consistent scene documentation, having one-button access to emergency assistance and procedures and communicating exact location saves time, lives and property, and in situations where voice communications are unsecure, encrypted data transmissions may be delivered in real-time. Meanwhile, having a common interface (the browser) regardless of device ensures that any first responder can immediately and effectively use the system.

Use Case #15—Contextual Web Services—News and Information—Business-to-Consumer (B2C): For purposes of this illustration, it is assumed that a local television news web site is being extended to deliver mobile web services to its viewers. They plan to deliver local and national/world news, business news, health and fitness tips, entertainment and community information, local forecast and weather, traffic, school closing and Amber alerts. The site is supported by advertising.

Leveraging embodiments of the contextual data communication platform described herein, when a mobile user pulls up the news site, they may be given various service options rather than web pages. For example, each user may be provided with a "MyNews" page where they can set their preferences and determine what information will be presented, and in what order. Service options can include downloading printed stories or video news segments, presenting only those videos and images that are compatible with the user's mobile device and/or that do not exceed the user's available memory. The site may link to a national or global news partner (Gannett, BBC, NBC News, WSJ) where world news, or stock quotes are available. Because the area is prone to severe weather, flash flooding and tornados, visitors can opt-in to receive weather alerts. They can also select to receive traffic alerts, Amber alerts and school closings based upon their address, zip code or GPS coordinates. The site also includes an Entertainment selection that presents weekend events, has a local restaurant and movie search service based upon the user's location information. They can even watch movie trailers, read a review or rate a movie. Because this web site is advertising driven, advertisers can "buy" menu placement spots that navigate to their offer or graphically sponsor a service, such as the Weather, or Daily Health Tip. Advertising can be contextually presented based upon location, preferences and selected services, such as daily health tips or school closure alerts, which provides additional demographic information about the mobile site visitor.

One clear benefit of usage of contextual data and a common web services interface in the present example for mobile customers is easy-to-use, menu driven services and information navigation. In this case, device contextual data may be used to drive the priority of services and products that are offered to the mobile user. It can also increase customer satisfaction, as the chance of a positive download experience increases when only device compatible options are presented. Device information, combined with visitor profile information allows the mobile web service to personalize the services and information menu, and ensure that advertising is relevant to that specific user.

Use Case #16—Contextual Web Services—Retail E-Commerce: For purposes of this illustration, it is assumed that a coffeehouse, such as Starbucks, wants to extend its web service offerings to their mobile users to improve loyalty and to reduce the morning and afternoon commute crunch on store employees. They also hope to increase the sale of their food, music and collectible inventory. To do so, they would like to tie their existing loyalty program to their payment processing system and individual store inventories. For transactional simplicity, they want to tie all mobile transactions to their existing debit card.

To illustrate an exemplary contextual web services solution, using an embodiment of the contextual data communication platform described herein, consider the following scenarios: Every time a mobile user comes to the coffeehouse web site, or clicks on the coffeehouse logo that might be presented in their browser menu, they are instantly logged into the mobile web service page that has been customized for them, because the site was able to read their loyalty member/card number from the contextual data stored on the user's mobile device. On GPS-enabled devices, the user can automatically find the closet store to their location and get a map or driving directions. For commuters in a rush, they can place their order, have it sent to the nearest location (or selected location) and have their coffeehouse card automatically debited. They can indicate whether they will pick-up at the drive thru or inside counter. Because the coffeehouse's web service center knows it's Bob Smith, he can already set up his preferences to make the ordering process even easier (the usual—a Grande Caramel Macchiato with whip, or set up a list of frequently ordered items that can be quickly selected from his browser menu). If he wants something different that day, he can select the menu until he finds what he wants. Because this is a live, two-way conversation, and it is the morning commute on Valentine's Day, Bob can be offered a plain croissant instead of banana nut bread (he's included nut allergies in his profile stored on his mobile device) and the latest Starbuck's Love Songs CD and pink heart travel mug just in case. Because this store is overstocked on mugs, Bob is offered a 25% discount. He can accept or ignore the offers and hit the "pay" button. Then, he simply drives up or walks in to get his coffee, which is piping hot, because the web service knew how far away he was when he placed his order. If he does not have enough funds left in his debit account, he can hit the reload button. During quieter hours of the day, the menus are adjusted to allow for mobile coupon delivery and in-store payment options. And of course, if Bob has regular commuting partners or family members, he can add them to my "companions" list for streamlined ordering on his day to pay.

In view of the foregoing and in the context of the present example, it should be appreciated that using various embodiments of the present invention all of these transactions may be based upon the ability to offer personalized services that tie on-device, user profile, local inventory levels and payment information back to a loyalty program (e.g., a Starbucks Card number). User, device, location data and time all trigger different options from the coffeehouse web services applications, to deliver a highly personalized experience and web service transaction set to meet the needs of both the customer and individual retail locations. The ability to extend the loyalty program into an e-commerce service is made possible by contextual data and the power and flexibility provided by transforming the browser into a true mobile web service interface.

Use Case #17—Contextual Web Services—Airline Loyalty: A common situation—a business traveler's meeting goes over the planned time. He/she leaves late, encounters unexpected traffic and long security lines at the airport. This causes missed flights, changes to hotel and car rental reservations and possible re-arranging of the next day's meetings.

Using various embodiments of the contextual data communication platform, an airline may facilitate reservation changes. For example, upon leaving the meeting late, the business traveler may select "United" from their customized browser menu presented on his/her mobile device. The United Mileage Plus web site may be displayed, the user automatically logged in and his/her location confirmed. Additionally, the route to the airport may be mapped and traffic conditions reported. Airport security line status may also be checked and the traveler may be provided with the option to confirm online check-in, check points, upgrade with points, change flight or cancel flight. If the flight is changed or cancelled, the traveler may be provided with the ability to select from either United's travel partners list or their own shortcuts to Marriott and/or Hertz and may be provided with another set of options from these service providers, including late arrival or late checkout, changing reservations, request shuttle, get directions, change class of car, etc.

As in various of the earlier use cases, in the context of the present example, it should be appreciated that using various embodiments of the present invention all of these selections may be based upon the ability to offer site appropriate menu selections and deliver from a profile database on the mobile device without typing, the Loyalty Program number and user login, location data and time. The ability to improve service levels for mobile users is enhanced using the web browser as a common interface. Loyalty program services can be instantly extended by providing additional services simply by linking and passing along this data to a mapping site, weather site or airport status database.

Use Case #18—Contextual Web Services—Life Science Data Hub Model: For purposes of this illustration, it is assumed that a pharmaceutical company is actively running a clinical trial with hospitals and clinics around the U.S. for a new use of an established drug that was originally FDA approved for use as an allergy medication. Several doctors have reported that a side effect of the medication in some patients is euphoria. The company is examining the effectiveness and safety of using this drug in higher doses as an anti-depressant, with hopes of it having fewer side effects than currently available formulations. The primary concern is that too-high a dose may have adverse affects on the cardiopulmonary system, including increased heart rate, blood pressure, hyperventilation and risk of vascular damage that could lead to bruising or small blood vessel tears.

Using various embodiments and features of the contextual data communication platform described herein, data may be input on desktop, laptops, tablet PCs and/or smartphones/PDAs. Patient medical data must be stored and transmitted consistent with HIPAA compliance—secured on-device and during transmission. Both new clinical trial and past clinical trial data may be accessed from multiple databases and cross-referenced by multiple organizations and individuals.

Patients may be given access to a web journal to report any mood changes, side effects or problems on a daily basis. When patents log in, the company web server knows who they are and opens their case file. Categorizing side-effects and presenting in-browser action menus for reporting results as mild, moderate or severe can populate the adverse event reporting system and trigger outbound communications and instructions to doctors and trial participants with similar medical/situation profiles. Additionally, since bruising or bleeding is a concern, vascular system imagery and physical examination photograph may be required to supplement doctors notes and basic readings. Date, time, location, device ID, patient ID and doctor ID can be embedded in the image to ensure accuracy.

In view of the foregoing scenario, it should be appreciated that using various embodiments of the present invention allows a menu-driven web interface to facilitate patient compliance of daily journal entries and ensure interface consistency across multiple devices. User and location data, including GPS (which includes altitude information) may be relevant to test results, as cardio-pulmonary function is affected by oxygen levels and relative pressure against tiny blood vessels. If not available, Zip code or city mashed up with topographical records can provide this data. Speed and accuracy of electronic data input and image uploading reduces workload and improves accuracy. Encryption and data compression keep data transport fast and compliant with HIPAA standards.

Use Case #19—Contextual Web Services—Internet Protocol Television (IPTV): For purposes of this illustration, it is assumed that a cable service provider would like to offer their existing set-top box services to customers who are away from their set-top box and television. Extending the service may be offered as a loyalty program, a means to augment existing subscription revenues or both. The cable television provider would also like to bolster advertising revenues and is looking for a way to extend their existing local advertising model. Additionally, the cable television provider is experimenting with new revenue/ad generating models that could be offered by levering the Internet to deliver IPTV services to their customers.

One challenge in connection with achieving the above goal a cable television provider, such as Comcast, is being able to "follow" their customers to any Internet connected device. To illustrate an exemplary contextual web services solution, using an embodiment of the contextual data communication platform described herein, consider the following: Bill has purchased the new Comcast Digital Anywhere Gold package. On his train commute home Sunday evenings, he can watch the Sopranos on his mobile device—formatted for his 240× 240 screen and delivered with maximum compression. He no longer has to wait to see his favorite program until everyone else is asleep (His wife hates it, and it's too mature for the kids). He simply opens up his browser, goes to the Comcast home page and is automatically logged into and selects from live or re-broadcasted options. On Monday's, Bill's wife, Mary, wants to watch Dancing with Stars, and their teenage daughter, Beth wants to watch Heroes, while Bill and the boys watch 24. They only have one set-top box, so Mary goes into the office (they have Comcast's high-speed Internet service) and watches Dancing with Stars. But before she does, changes her account settings, giving Comcast permission to activate Beth's PCs for all basic cable channels and Bill's mobile for the entire Gold Anywhere service. The women watch their programs live on their computers (with national and local commercials tailored for her neighborhood and demographics). Because the program request made to Comcast contains operating system and device capabilities, the video is perfectly formatted for their 17" High-Def displays and since Beth has Harman/Kardon speakers, CD quality audio streams for Heroes.

Jim watches Heroes on his GPS-enabled laptop in a hotel room, two cities over and he is receiving local advertisements for restaurants, in-room pizza delivery and the local airport shuttle. He then orders a pay-per-view movie which he downloads to watch on his flight home and the charge simply shows up on his monthly bill. Meanwhile, in Little Rock, Comcast, ABC and Disney are testing new interactive advertising model where episodes of Hannah Montana allow users to "click on" Hannah's boots or the new Chevy truck for product & purchasing information. And during the commercial break, Pizza Hut allows viewers to select order/home delivery timed to arrive by the program's end. Viewers can pay for their pizza with a credit card, cash to the delivery man or Comcast's newest service where the pizza appears as an itemized line on the bill (with Comcast brokering the transaction for Pizza Hut for a small transactional fee).

In view of the foregoing scenario, it should be appreciated that using various embodiments of the present invention to tie specific device—Bill's mobile device, Jim's GPS-enabled phone, Beth's & Mary's PC & peripheral capabilities, location, demographic details to Comcast's existing account profile and management systems and digital content delivery systems, customers get new, valuable services and Comcast address its business goals.

In any of the above use cases/examples, site appropriate menu selections may be made available to and displayed by a client device based on the delivery of custom menu information from a server to the client device via an augmented HTML file, for example.

Embodiments of the present invention provide novel systems, methods and devices for a contextual data platform.

While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A computer-implemented method comprising:
   receiving, by a context management routine running on a server device, (i) a request from a client device and (ii) contextual information relating to one or both of the client device and an end user of the client device, the request relating to a web service supported by the server device;
   responsive to the request and the contextual information, the context management routine causing the client device to dynamically reconfigure menu information/structure presented by an operating system or an application running on the client device by transmitting to the client device contextual menu information based at least in part on the web service and the contextual information;
   wherein the menu information/structure comprises part of a browser menu and is intended at least in part to shift navigation away from one or more web pages associated with the web service and into the browser menu;
   wherein the client device comprises an Internet-enabled mobile device;
   wherein the contextual information is embedded within the request and includes data indicative of one or more of (i) personal information regarding the end user of the Internet-enabled mobile device, (ii) device information regarding capabilities or characteristics of the Internet-enabled mobile device and (iii) a geographical location of the Internet-enabled mobile device; and
   wherein one or more non-transitory computer-readable storage media associated with the server device have embodied thereon instructions representing the context management routine that are executable by one or more processors of the server device.

2. The method of claim 1, wherein the request comprises a HyperText Transport Protocol (HTTP) request.

3. The method of claim 1, wherein the request comprises an augmented HTTP request.

4. The method of claim 1, wherein the Internet-enabled mobile device comprises a laptop computer, an ultra mobile PC, a game console, a pocket personal computer or a mobile phone.

5. The method of claim 1, wherein said transmitting to the client device contextual menu information comprises transmitting to the client device an augmented HyperText Markup Language (HTML) file within which the contextual menu information is embedded.

6. A computer-implemented method comprising:
   generating, by a context management routine running on client device, (i) a request to a server device relating to a web service supported by the server device and (ii) contextual information relating to one or both of the client device and an end user of the client device;
   receiving, by the context management routine, a response to the request, the response having associated therewith contextual menu information based at least in part on the web service and the contextual information; and
   responsive to receipt of the contextual menu information, the context management routine, facilitating interaction with the web service by causing menu information/structure presented by an operating system or an application running on the client device to be dynamically reconfigured;
   wherein the menu information/structure comprises part of a browser menu and is intended at least in part to shift navigation away from one or more web pages associated with the web service and into the browser menu;
   wherein the client device comprises an Internet-enabled mobile device;
   wherein the contextual information is embedded within the request and includes data indicative of one or more of (i) personal information regarding the end user of the Internet-enabled mobile device, (ii) device information regarding capabilities or characteristics of the Internet-enabled mobile device and (iii) a geographical location of the Internet-enabled mobile device; and
   wherein one or more non-transitory computer-readable storage media associated with the client device have embodied thereon instructions representing the context management routine that are executable by one or more processors of the client device.

7. The method of claim 6, wherein the request comprises a HyperText Transport Protocol (HTTP) request.

8. The method of claim 6, wherein the request comprises an augmented HTTP request.

9. The method of claim 6, wherein said receiving, by the client device, a response to the request comprises receiving an augmented HyperText Markup Language (HTML) file within which the contextual menu information is embedded.

10. A non-transitory program storage device readable by one or more processors of a server device, tangibly embodying a program of instructions executable by the one or more processors to perform method steps for augmenting display menus of a client device to be contextually aware, said method steps comprising:
    receiving, by the server device, a request from the client device and contextual information relating to one or both of the client device and an end user of the client device, the request relating to a web service supported by the server device;
    responsive to the request and the contextual information, the server device causing the client device to dynamically reconfigure menu information/structure presented by an operating system or an application running on the client device by transmitting to the client device contextual menu information based at least in part on the web service and the contextual information;
    wherein the menu information/structure comprises part of a browser menu and is intended at least in part to shift navigation away from one or more web pages associated with the web service and into the browser menu;
    wherein the client device comprises an Internet-enabled mobile device; and
    wherein the contextual information is embedded within the request and includes data indicative of one or more of (i) personal information regarding the end user of the Internet-enabled mobile device, (ii) device information regarding capabilities or characteristics of the Internet-enabled mobile device and (iii) a geographical location of the Internet-enabled mobile device.

11. The program storage device of claim 10, wherein the request comprises a HyperText Transport Protocol (HTTP) request.

12. The program storage device of claim 10, wherein the request comprises an augmented HTTP request.

13. The program storage device of claim 10, wherein the Internet-enabled mobile device comprises a laptop computer, an ultra mobile PC, a game console, a pocket personal computer or a mobile phone.

14. The program storage device of claim 10, wherein said transmitting to the client device contextual menu information comprises transmitting to the client device an augmented HyperText Markup Language (HTML) file within which the contextual menu information is embedded.

15. A non-transitory program storage device readable by one or more processors of an Internet-enabled mobile client device, tangibly embodying a program of instructions executable by the one or more processors to perform method steps for augmenting display menus of the client device to be contextually aware based on contextual menu information received from a server device, said method steps comprising:

generating, by the Internet-enabled mobile client device, (i) a request to the server device relating to a web service supported by the server device and (ii) contextual information relating to one or both of the Internet-enabled mobile client device and an end user of the Internet-enabled mobile device;

receiving, by the Internet-enabled mobile client device, a response to the request, the response having associated therewith contextual menu information based at least in part on the web service and the context information;

responsive to the contextual menu information, the Internet-enabled mobile client device, facilitating interaction with the web service by dynamically reconfiguring menu information/structure presented by an operating system or an application running on the client device;

wherein the menu information/structure comprises part of a browser menu and is intended at least in part to shift navigation away from one or more web pages associated with the web service and into the browser menu;

wherein the client device comprises an Internet-enabled mobile device; and wherein the contextual information is embedded within the request and includes data indicative of one or more of (i) personal information regarding the end user of the Internet-enabled mobile device, (ii) device information regarding capabilities or characteristics of the Internet-enabled mobile device and (iii) a geographical location of the Internet-enabled mobile device.

16. The program storage device of claim 15, wherein the request comprises a HyperText Transport Protocol (HTTP) request.

17. The program storage device of claim 15, wherein the request comprises an augmented HTTP request.

18. The program storage device of claim 15, wherein said receiving, by the client device, a response to the request comprises receiving an augmented HyperText Markup Language (HTML) file within which the contextual menu information is embedded.

\* \* \* \* \*